United States Patent
Chen

(10) Patent No.: US 9,828,808 B2
(45) Date of Patent: Nov. 28, 2017

(54) IMPROVING DRILL BIT STABILITY USING TRACK-SET DEPTH OF CUT CONTROL ELEMENTS

(71) Applicant: Halliburton Energy Services, Inc., Houston, TX (US)

(72) Inventor: Shilin Chen, Montgomery, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 326 days.

(21) Appl. No.: 14/413,953

(22) PCT Filed: Jul. 12, 2013

(86) PCT No.: PCT/US2013/050341
§ 371 (c)(1),
(2) Date: Jan. 9, 2015

(87) PCT Pub. No.: WO2014/012038
PCT Pub. Date: Jan. 16, 2014

(65) Prior Publication Data
US 2015/0198029 A1 Jul. 16, 2015

Related U.S. Application Data

(60) Provisional application No. 61/671,575, filed on Jul. 13, 2012.

(51) Int. Cl.
*E21B 10/42* (2006.01)
*E21B 10/36* (2006.01)
(Continued)

(52) U.S. Cl.
CPC .............. *E21B 10/43* (2013.01); *E21B 10/42* (2013.01); *G05B 15/02* (2013.01)

(58) Field of Classification Search
CPC .... E21B 10/42; E21B 10/36; E21B 2010/425; E21B 10/43; E21B 10/46; E21B 10/54;
(Continued)

(56) References Cited

U.S. PATENT DOCUMENTS 5,090,492 A 2/1992 Keith
5,265,685 A 11/1993 Keith et al.
(Continued)

FOREIGN PATENT DOCUMENTS

WO 2012/064948 5/2012

OTHER PUBLICATIONS

International Preliminary Report on Patentability issued in PCT/US2013/050341; 8 pages, dated Jan. 13, 2015.
(Continued)

*Primary Examiner* — Cathleen R Hutchins
(74) *Attorney, Agent, or Firm* — Baker Botts L.L.P.

(57) ABSTRACT

A drill bit using track-set depth of cut control elements to provide improved stability is disclosed. A drill bit for drilling a wellbore includes a bit body with a rotational axis extending therethrough. The drill bit further includes a plurality of blades disposed on exterior portions of the bit body. The drill bit includes a first group of track set depth of cut controllers (DOCCs) disposed on exterior portions of a first set of the plurality of blades. The first group of track set DOCCs configured to be placed within a first radial swath of a bit face of the drill bit and configured to provide a first critical depth of cut (CDOC).

20 Claims, 25 Drawing Sheets

(51) Int. Cl.
*E21B 10/43* (2006.01)
*E21B 10/46* (2006.01)
*E21B 10/62* (2006.01)
*E21B 10/627* (2006.01)
*E21B 10/633* (2006.01)
*G05B 15/02* (2006.01)

(58) Field of Classification Search
CPC ............... E21B 2010/545; E21B 10/55; E21B 10/1062; E21B 2010/622; E21B 2010/624; E21B 10/627; E21B 10/633; G05B 17/00
See application file for complete search history.

(56) References Cited

U.S. PATENT DOCUMENTS

| | | |
|---|---|---|
| 5,595,252 A | 1/1997 | O'Hanlon |
| 5,607,024 A | 3/1997 | Keith et al. |
| 7,360,608 B2 | 4/2008 | Brackin et al. |
| 2001/0030063 A1 | 10/2001 | Dykstra et al. |
| 2007/0151770 A1* | 7/2007 | Ganz ........................ E21B 10/43 |
| | | 175/426 |
| 2010/0193248 A1 | 8/2010 | Radford et al. |
| 2012/0111630 A1* | 5/2012 | Chen ........................ E21B 10/43 |
| | | 175/45 |

OTHER PUBLICATIONS

International Search Report and Written Opinion, Application No. PCT/US2013/050341, 10 pages, dated Dec. 20, 2013.

Extended European Search Report received from European Patent Application No. 13816672.3, dated Jun. 15, 2016; 6 pages.

Office Action received from Canadian Patent Application No. 2878907, dated Aug. 17, 2016, 4 pages.

* cited by examiner

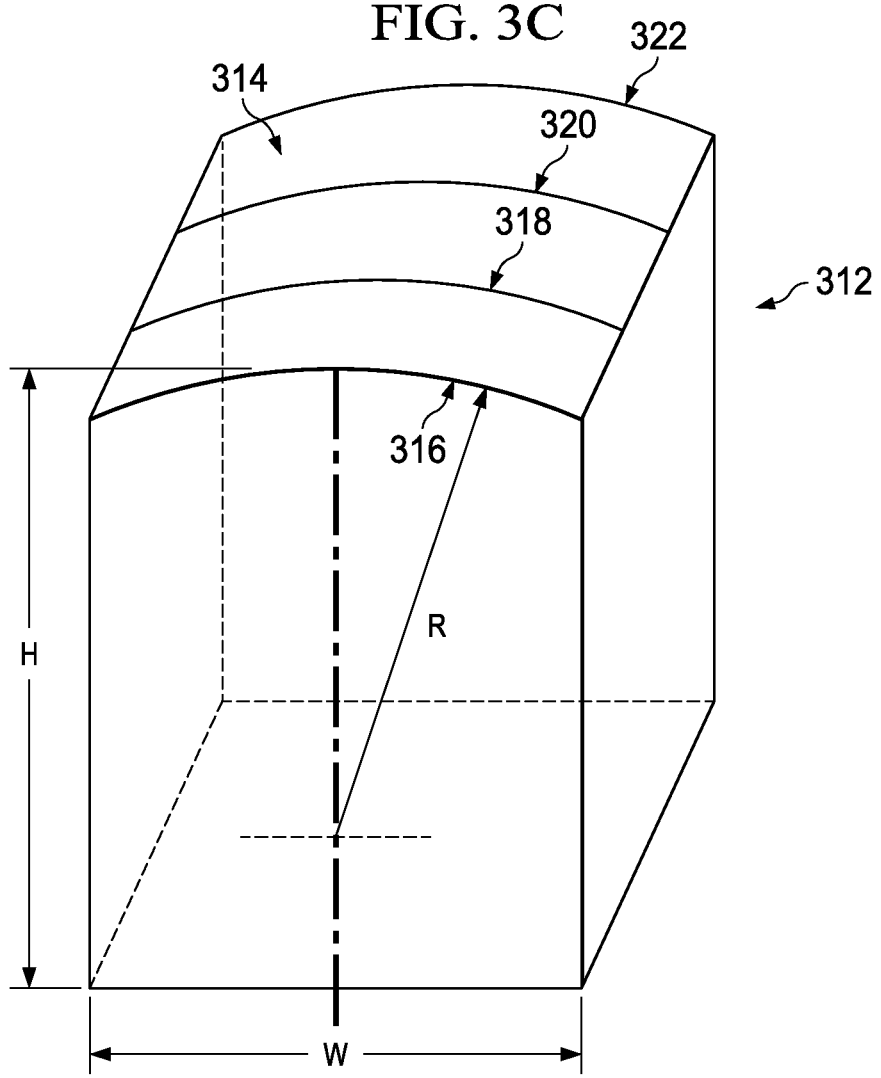

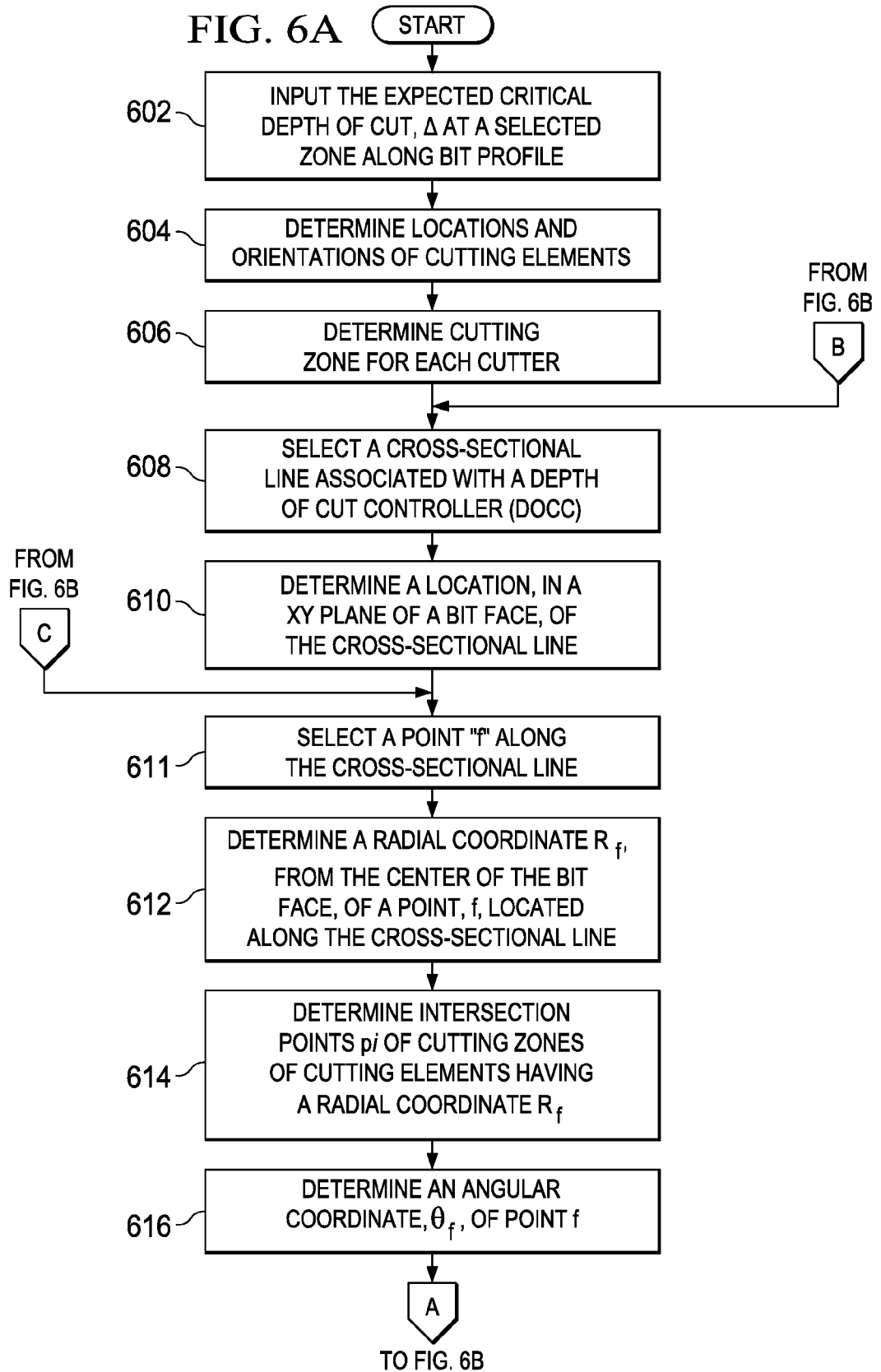

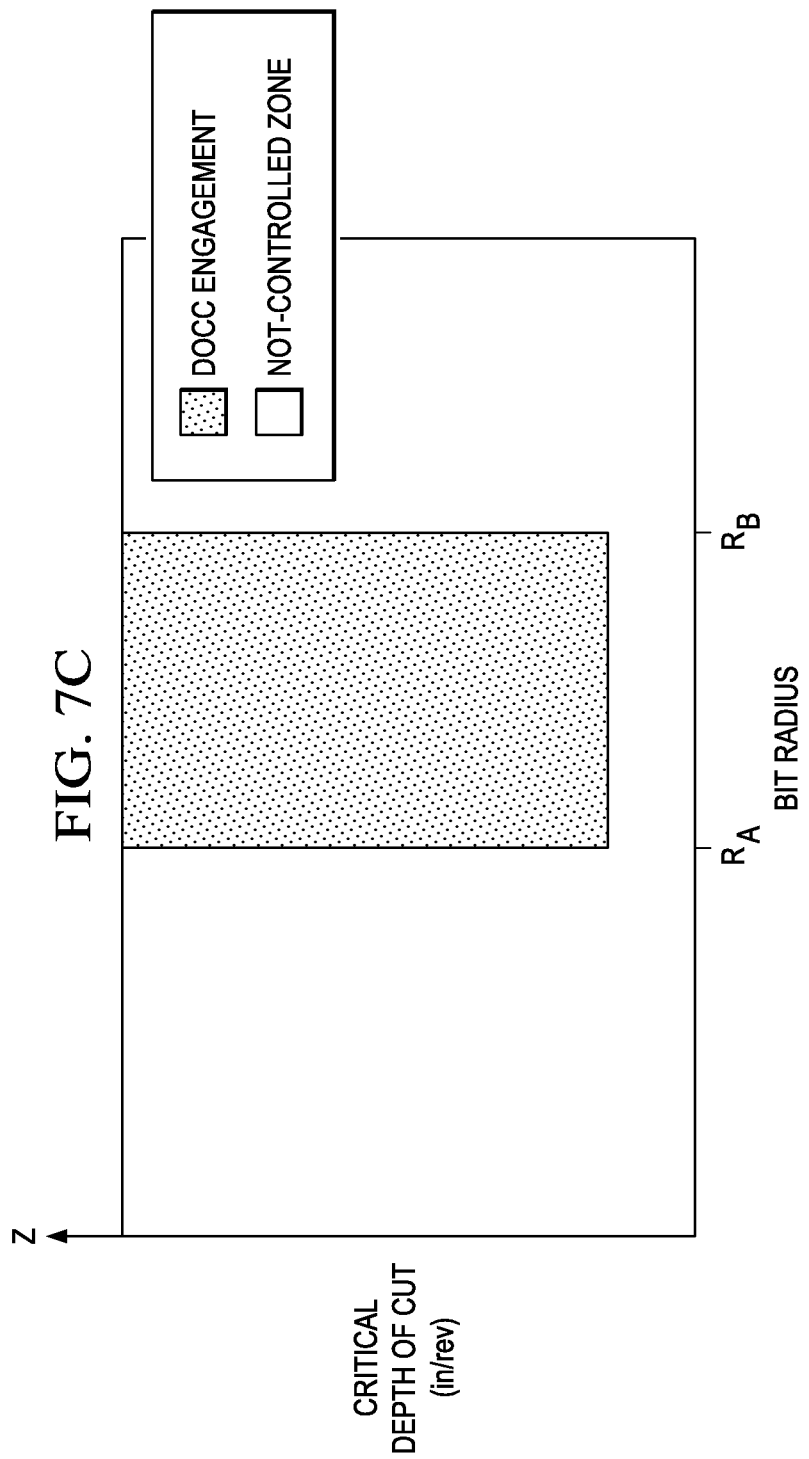

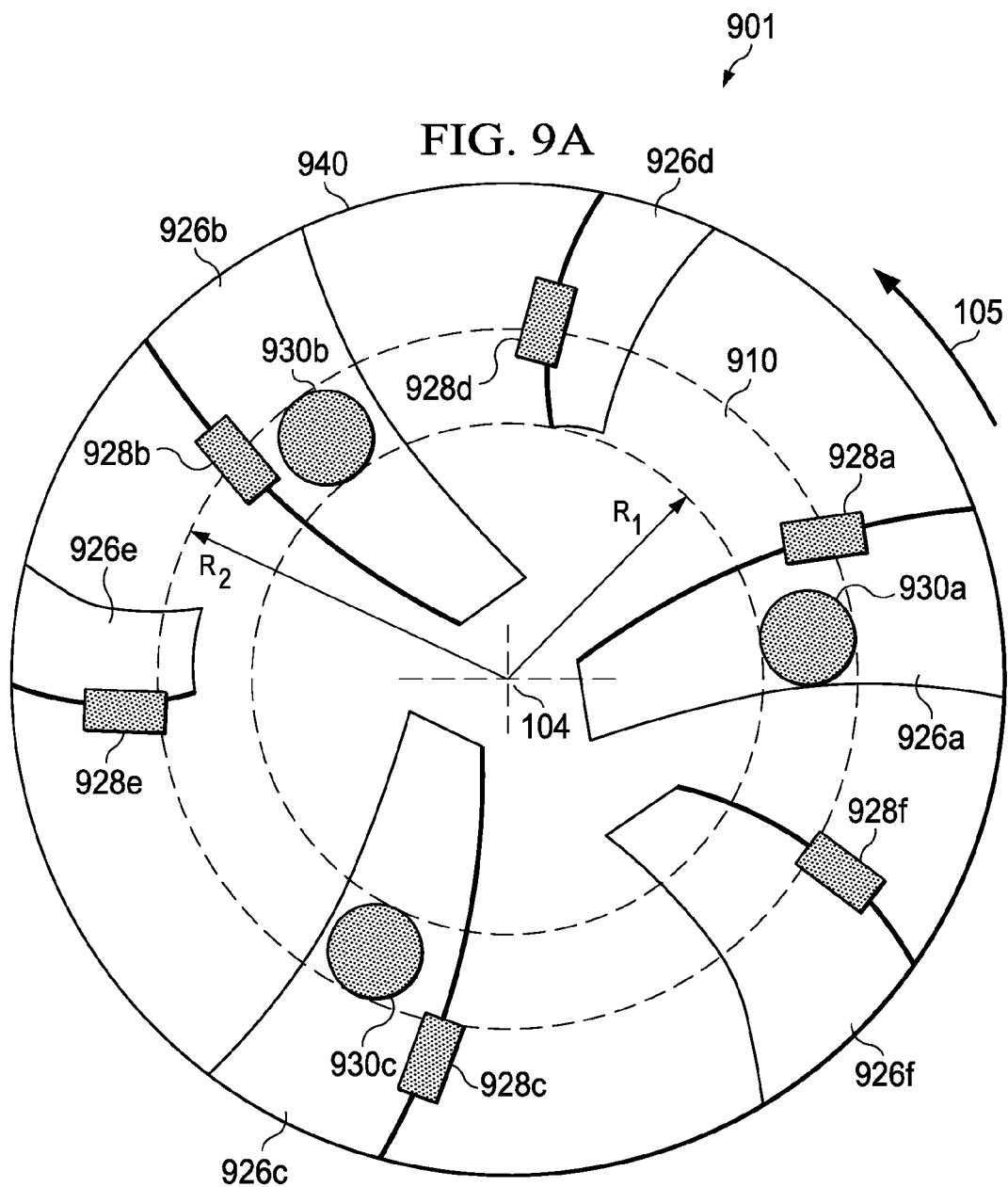

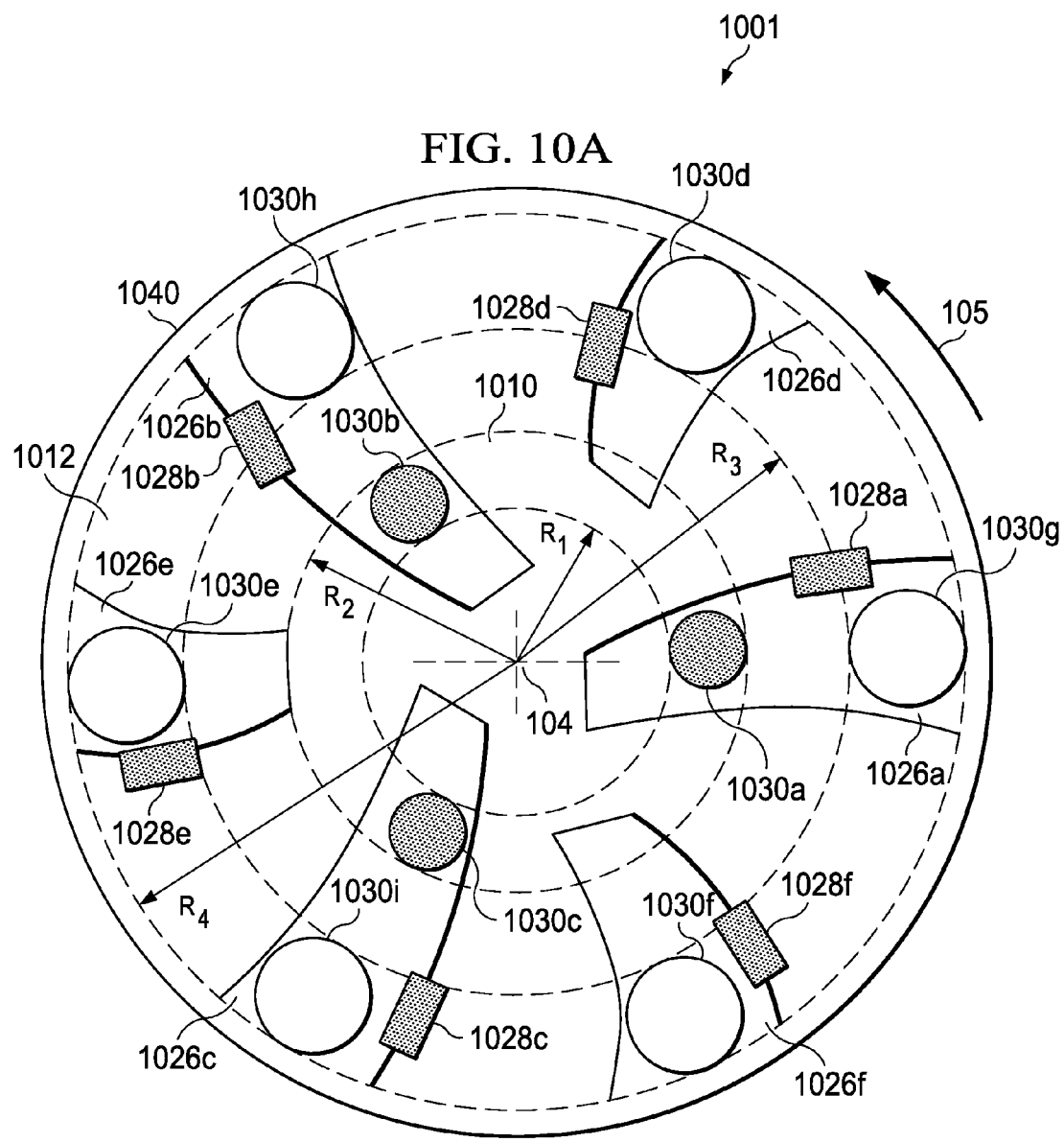

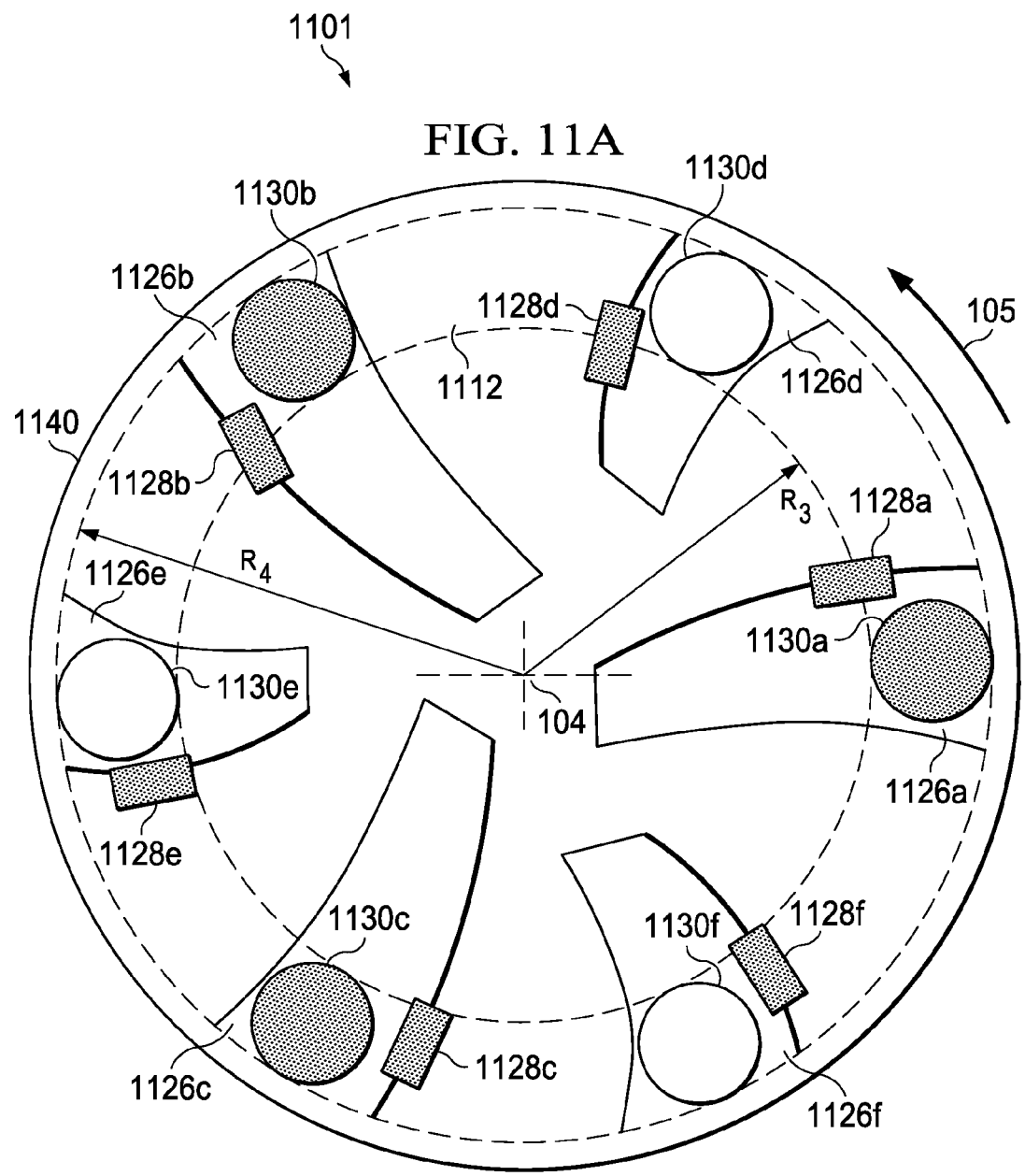

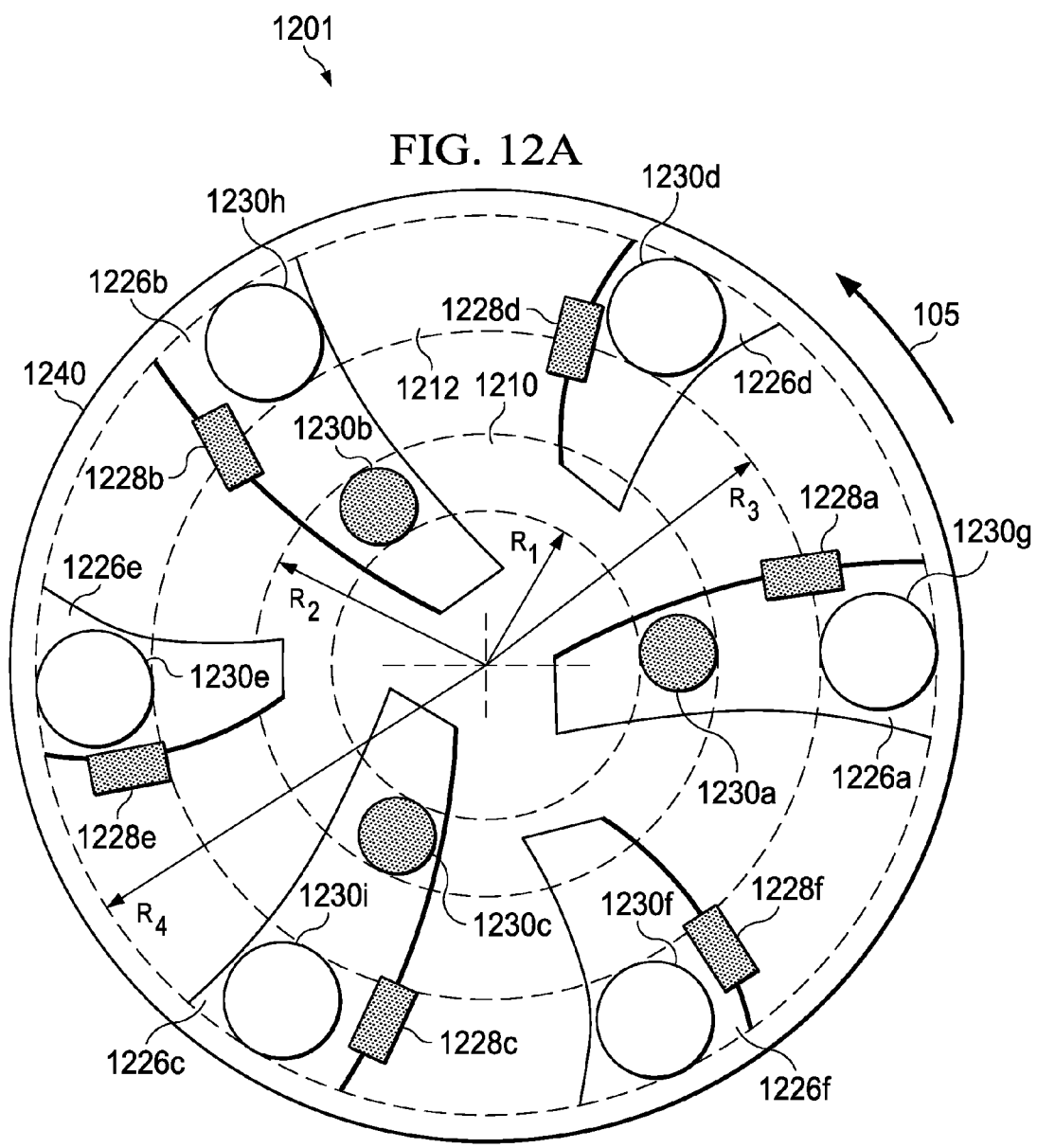

IMPROVING DRILL BIT STABILITY USING TRACK-SET DEPTH OF CUT CONTROL ELEMENTS

RELATED APPLICATIONS

This application is a U.S. National Stage Application of International Application No. PCT/US2013/050341 filed Jul. 12, 2013, which designates the United States, and claims the benefit of U.S. Provisional Patent Application Ser. No. 61/671,575 filed Jul. 13, 2012, and which are incorporated herein by reference in their entirety.

TECHNICAL FIELD

The present disclosure relates generally to downhole drilling tools and, more particularly, to improving drill bit stability using track-set depth of cut control elements.

BACKGROUND

Various types of downhole drilling tools including, but not limited to, rotary drill bits, reamers, core bits, and other downhole tools have been used to form wellbores in associated downhole formations. Examples of such rotary drill bits include, but are not limited to, fixed cutter drill bits, drag bits, polycrystalline diamond compact (PDC) drill bits, and matrix drill bits associated with forming oil and gas wells extending through one or more downhole formations. Fixed cutter drill bits such as a PDC bit may include multiple blades that each include multiple cutting elements.

In typical drilling applications, a PDC bit may be used to drill through various levels or types of geological formations with longer bit life than non-PDC bits. Typical formations may generally have a relatively low compressive strength in the upper portions (e.g., lesser drilling depths) of the formation and a relatively high compressive strength in the lower portions (e.g., greater drilling depths) of the formation. Thus, it may become increasingly more difficult to drill at increasingly greater depths. Additionally, the ideal bit for drilling at any particular depth is typically a function of the compressive strength of the formation at that depth. Accordingly, the ideal bit for drilling changes as a function of drilling depth.

A drilling tool, such as a PDC bit, may include one or more depth of cut controllers (DOCCs). Exterior portions of the blades, the cutting elements, and the DOCCs may be described as forming portions of the bit face. The DOCCs are physical structures configured to (e.g., according to their shape and relative positioning on the PDC bit) control the amount that the cutting elements of the drilling tool cut into a geological formation. However, conventional configurations for DOCCs may cause an uneven depth of cut control of the cutting elements of the drilling tool. This uneven depth of cut control may allow for portions of the DOCCs to wear unevenly. Furthermore, uneven depth of cut control may cause the drilling tool to vibrate, which may damage parts of the drill string or slow the drilling process.

BRIEF DESCRIPTION OF THE DRAWINGS

For a more complete understanding of the present disclosure and its features and advantages, reference is now made to the following description, taken in conjunction with the accompanying drawings, in which:

FIG. 3C illustrates the DOCC of FIG. 3A designed according to some embodiments of the present disclosure;

FIGS. 6A and 6B illustrate a flow chart of an example method for configuring a DOCC, in accordance with some embodiments of the present disclosure;

FIG. 7C illustrates a CDCCC for a drill bit, in accordance with some embodiments of the present disclosure;

FIG. 9A illustrates a bit face of an example drill bit with DOCCs for controlling the depth of cut of the drill bit to a CDOC within a radial swath, in accordance with some embodiments of the present disclosure;

FIG. 10A illustrates a bit face of another example drill bit with DOCCs for controlling the depth of cut of the drill bit to a CDOC in multiple radial swaths, in accordance with some embodiments of the present disclosure;

FIG. 11A illustrates a bit face of a further example drill bit with DOCCs for controlling the depth of cut of the drill bit at multiple CDOCs within a radial swath, in accordance with some embodiments of the present disclosure;

FIG. 12A illustrates a bit face of another example drill bit with DOCCs for controlling the depth of cut of the drill bit at multiple CDOCs and in multiple radial swaths, in accordance with some embodiments of the present disclosure;

DETAILED DESCRIPTION

Embodiments of the present disclosure and its advantages are best understood by referring to FIGS. 1 through 13D, where like numbers are used to indicate like and corresponding parts.

Figure 1:
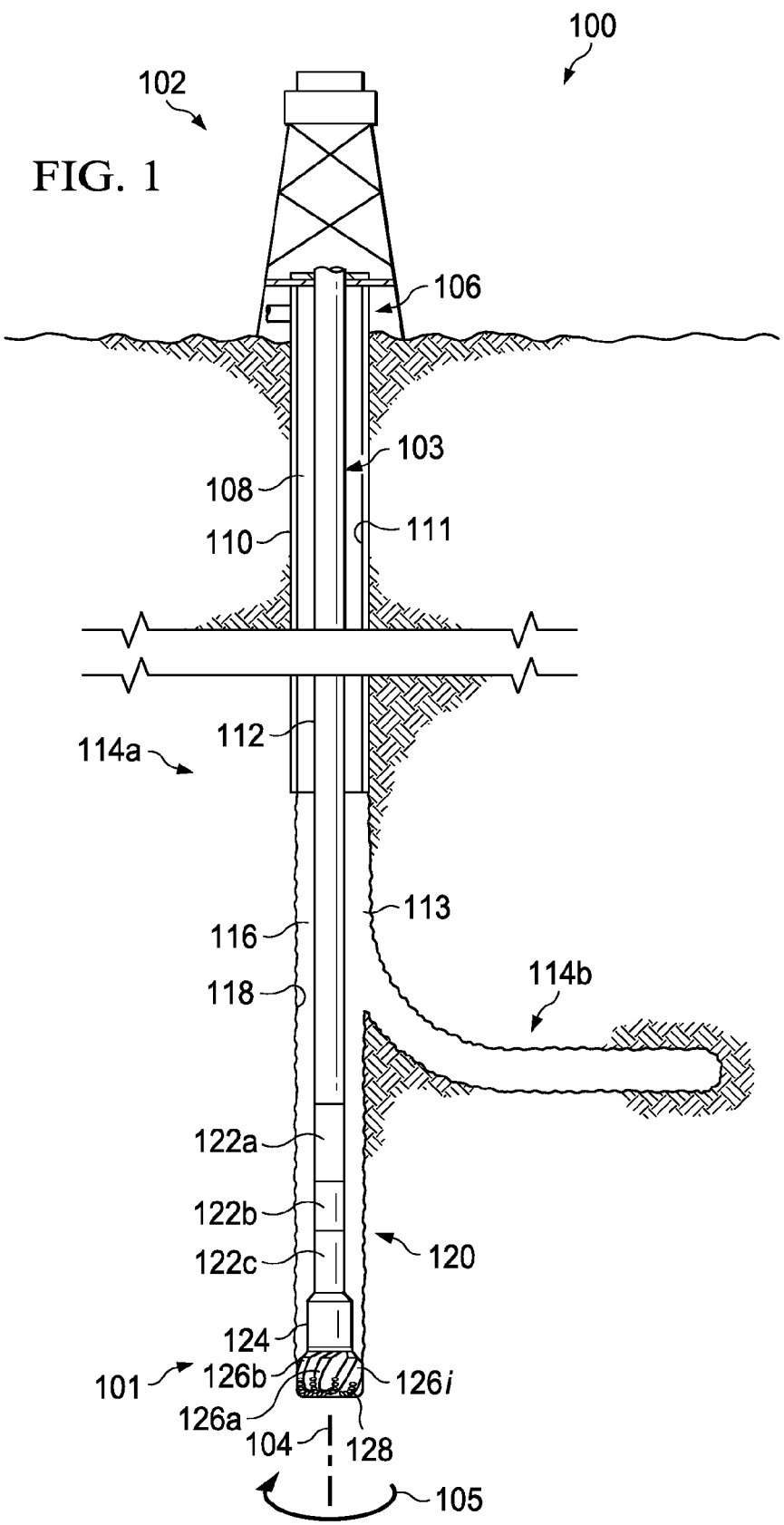
FIG. 1 illustrates an example embodiment of a drilling system configured to drill into one or more geological formations, in accordance with some embodiments of the present disclosure.

FIG. 1 illustrates an example embodiment of drilling system 100 configured to drill into one or more geological formations, in accordance with some embodiments of the present disclosure. While drilling into different types of geological formations it may be advantageous to control the amount that a downhole drilling tool cuts into the side of a geological formation in order to reduce wear on the cutting elements of the drilling tool, prevent uneven cutting into the formation, increase control of penetration rate, reduce tool vibration, etc. As disclosed in further detail below, drilling system 100 may include downhole drilling tools (e.g., a drill bit, a reamer, a hole opener, etc.) that may include one or more cutting elements with a depth of cut that may be controlled by one or more depth of cut controllers (DOCC).

As disclosed in further detail below, a DOCC may be configured to control the depth of cut of a cutting element (sometimes referred to as a "cutter"). DOCCs may be configured to control the depth of cut at one or more defined and/or predetermined critical depth of cut (CDOC). Additionally, according to some embodiments, a DOCC may be configured to overlap a radial swath of the drill bit associated with a rotational path of another DOCC, e.g., track set, as disclosed in further detail below. In some embodiments, DOCCs may be track set with other DOCCs. Groups of DOCCs may be track set with each other and/or may be track set with other groups of DOCCs configured to control the depth of cut to the same or different CDOC. In contrast, a DOCC configured according to traditional methods may not be configured according to another DOCC that overlaps the rotational path of the DOCC. Accordingly, a DOCC designed according to the present disclosure may provide a more constant and even depth of cut control of the drilling tool than those designed using conventional methods.

Drilling system 100 may include rotary drill bit ("drill bit") 101. Drill bit 101 may be any of various types of fixed cutter drill bits, including PDC bits, drag bits, matrix drill bits, and/or steel body drill bits operable to form wellbore 114 extending through one or more downhole formations. Drill bit 101 may be designed and formed in accordance with teachings of the present disclosure and may have many different designs, configurations, and/or dimensions according to the particular application of drill bit 101.

Drill bit 101 may include one or more blades 126 (e.g., blades 126a-126i) that may be disposed outwardly from exterior portions of rotary bit body 124 of drill bit 101. Rotary bit body 124 may have a generally cylindrical body and blades 126 may be any suitable type of projections extending outwardly from rotary bit body 124. For example, a portion of blade 126a may be directly or indirectly coupled to an exterior portion of bit body 124, while another portion of blade 126a may be projected away from the exterior portion of bit body 124. Blades 126 formed in accordance with teachings of the present disclosure may have a wide variety of configurations including, but not limited to, substantially arched, helical, spiraling, tapered, converging, diverging, symmetrical, and/or asymmetrical.

In some cases, blades 126 may have substantially arched configurations, generally helical configurations, spiral shaped configurations, or any other configuration satisfactory for use with each downhole drilling tool. One or more blades 126 may have a substantially arched configuration extending from proximate rotational axis 104 of bit 101. The arched configuration may be defined in part by a generally concave, recessed shaped portion extending from proximate bit rotational axis 104. The arched configuration may also be defined in part by a generally convex, outwardly curved portion disposed between the concave, recessed portion and exterior portions of each blade which correspond generally with the outside diameter of the rotary drill bit.

In an embodiment of drill bit 101, blades 126 may include primary blades disposed generally symmetrically about the bit rotational axis. For example, one embodiment may include three primary blades oriented approximately 120 degrees relative to each other with respect to bit rotational axis 104 in order to provide stability for drill bit 101. In some embodiments, blades 126 may also include at least one secondary blade disposed between the primary blades. The number and location of secondary blades and primary blades may vary substantially. Blades 126 may be disposed symmetrically or asymmetrically with regard to each other and bit rotational axis 104 where the disposition may be based on the downhole drilling conditions of the drilling environment.

Each of blades 126 may include a first end disposed proximate or toward bit rotational axis 104 and a second end disposed proximate or toward exterior portions of drill bit 101 (i.e., disposed generally away from bit rotational axis 104 and toward uphole portions of drill bit 101). The terms "downhole" and "uphole" may be used in this application to describe the location of various components of drilling system 100 relative to the bottom or end of a wellbore. For example, a first component described as "uphole" from a second component may be further away from the end of the wellbore than the second component. Similarly, a first component described as being "downhole" from a second component may be located closer to the end of the wellbore than the second component.

Each blade may have a leading (or front) surface disposed on one side of the blade in the direction of rotation of drill bit 101 and a trailing (or back) surface disposed on an opposite side of the blade away from the direction of rotation of drill bit 101. Blades 126 may be positioned along bit body 124 such that they have a spiral configuration relative to rotational axis 104. In other embodiments, blades 126 may be positioned along bit body 124 in a generally parallel configuration with respect to each other and bit rotational axis 104.

Blades 126 may have a general arcuate configuration extending radially from rotational axis 104. The arcuate configurations of blades 126 may cooperate with each other to define, in part, a generally cone shaped or recessed portion disposed adjacent to and extending radially outward from the bit rotational axis. Exterior portions of blades 126, cutting elements 128 and DOCCs (not expressly shown) may be described as forming portions of the bit face.

Blades 126 may include one or more cutting elements 128 disposed outwardly from exterior portions of each blade 126. For example, a portion of cutting element 128 may be directly or indirectly coupled to an exterior portion of blade 126 while another portion of cutting element 128 may be projected away from the exterior portion of blade 126. Cutting elements 128 may be any suitable device configured to cut into a formation, including but not limited to, primary cutting elements, backup cutting elements or any combination thereof. By way of example and not limitation, cutting elements 128 may be various types of cutters, compacts, buttons, inserts, and gage cutters satisfactory for use with a wide variety of drill bits 101.

Cutting elements 128 may include respective substrates with a layer of hard cutting material disposed on one end of each respective substrate. The hard layer of cutting elements 128 may provide a cutting surface that may engage adjacent portions of a downhole formation to form wellbore 114. The contact of the cutting surface with the formation may form a cutting zone associated with each of cutting elements 128. The edge of the cutting surface located within the cutting zone may be referred to as the cutting edge of cutting element 128.

Each substrate of cutting elements 128 may have various configurations and may be formed from tungsten carbide or other materials associated with forming cutting elements for rotary drill bits. Tungsten carbides may include, but are not limited to, monotungsten carbide (WC), ditungsten carbide ($W_2C$), macrocrystalline tungsten carbide and cemented or sintered tungsten carbide. Substrates may also be formed using other hard materials, which may include various metal alloys and cements such as metal borides, metal carbides, metal oxides and metal nitrides. For some applications, the hard cutting layer may be formed from substantially the same materials as the substrate. In other applications, the hard cutting layer may be formed from different materials than the substrate. Examples of materials used to form hard cutting layers may include polycrystalline diamond materials, including synthetic polycrystalline diamonds.

Blades 126 may also include one or more DOCCs (not expressly shown) configured to control the depth of cut of cutting elements 128. A DOCC may comprise an impact arrestor, a backup cutter and/or an MDR (Modified Diamond Reinforcement). In the same or alternative embodiments, one or more DOCCs may be configured according to other DOCCs overlapping the rotational paths of the DOCCs. Accordingly, one or more DOCCs of a drill bit may be configured according to the present disclosure to provide a constant depth of cut of cutting elements 128.

Blades 126 may further include one or more gage pads (not expressly shown) disposed on blades 126. A gage pad may be a gage, gage segment, or gage portion disposed on exterior portion of blade 126. Gage pads may often contact adjacent portions of wellbore 114 formed by drill bit 101. Exterior portions of blades 126 and/or associated gage pads may be disposed at various angles, either positive, negative, and/or parallel, relative to adjacent portions of a straight wellbore (e.g., wellbore 114a). A gage pad may include one or more layers of hardfacing material.

Drilling system 100 may also include a well surface or well site 106. Various types of drilling equipment such as a rotary table, mud pumps and mud tanks (not expressly shown) may be located at well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may include drill string 103 associated with drill bit 101 that may be used to form a wide variety of wellbores or bore holes such as generally vertical wellbore 114a or generally horizontal wellbore 114b as shown in FIG. 1. Various directional drilling techniques and associated components of bottom hole assembly (BHA) 120 of drill string 103 may be used to form horizontal wellbore 114b. For example, lateral forces may be applied to drill bit 101 proximate kickoff location 113 to form horizontal wellbore 114b extending from generally vertical wellbore 114a.

BHA 120 may be formed from a wide variety of components configured to form a wellbore 114. For example, components 122a, 122b and 122c of BHA 120 may include, but are not limited to, drill bits (e.g., drill bit 101) drill collars, rotary steering tools, directional drilling tools, downhole drilling motors, reamers, hole enlargers or stabilizers. The number of components such as drill collars and different types of components 122 included in BHA 120 may depend upon anticipated downhole drilling conditions and the type of wellbore that will be formed by drill string 103 and rotary drill bit 101.

A wellbore 114 may be defined in part by a casing string 110 that may extend from well surface 106 to a selected downhole location. Portions of wellbore 114, as shown in FIG. 1, that do not include casing string 110 may be described as "open hole." Various types of drilling fluid may be pumped from well surface 106 through drill string 103 to attached drill bit 101. Such drilling fluids may be directed to flow from drill string 103 to respective nozzles (not expressly shown) included in rotary drill bit 100. The drilling fluid may be circulated back to well surface 106 through an annulus 108 defined in part by outside diameter 112 of drill string 103 and inside diameter 118 of wellbore 114a. Inside diameter 118 may be referred to as the "sidewall" of wellbore 114a. Annulus 108 may also be defined by outside diameter 112 of drill string 103 and inside diameter 111 of casing string 110.

The rate of penetration (ROP) of drill bit 101 may be a function of both weight on bit (WOB) and revolutions per minute (RPM). Drill string 103 may apply weight on drill bit 101 and may also rotate drill bit 101 about rotational axis 104 to form a wellbore 114 (e.g., wellbore 114a or wellbore 114b). For some applications a downhole motor (not expressly shown) may be provided as part of BHA 120 to also rotate drill bit 101. The depth of cut controlled by DOCCs (not expressly shown) may also be based on the ROP and RPM of a particular bit. Accordingly, as described in further detail below, the configuration of the DOCCs to provide a CDOC of cutting elements 128 may be based in part on the desired ROP and RPM of a particular drill bit 101. Further, in some embodiments, the configuration of the DOCCs may be based on multiple defined and/or predetermined CDOCs. Providing control of the depth of cut at one or more CDOCs may serve to minimize and/or eliminate uneven depth of cut by the cutting elements and/or minimize vibration associated with drill bit 101. Excess vibration may damage portions of drill string 103 and/or drill bit 101.

Figure 2:
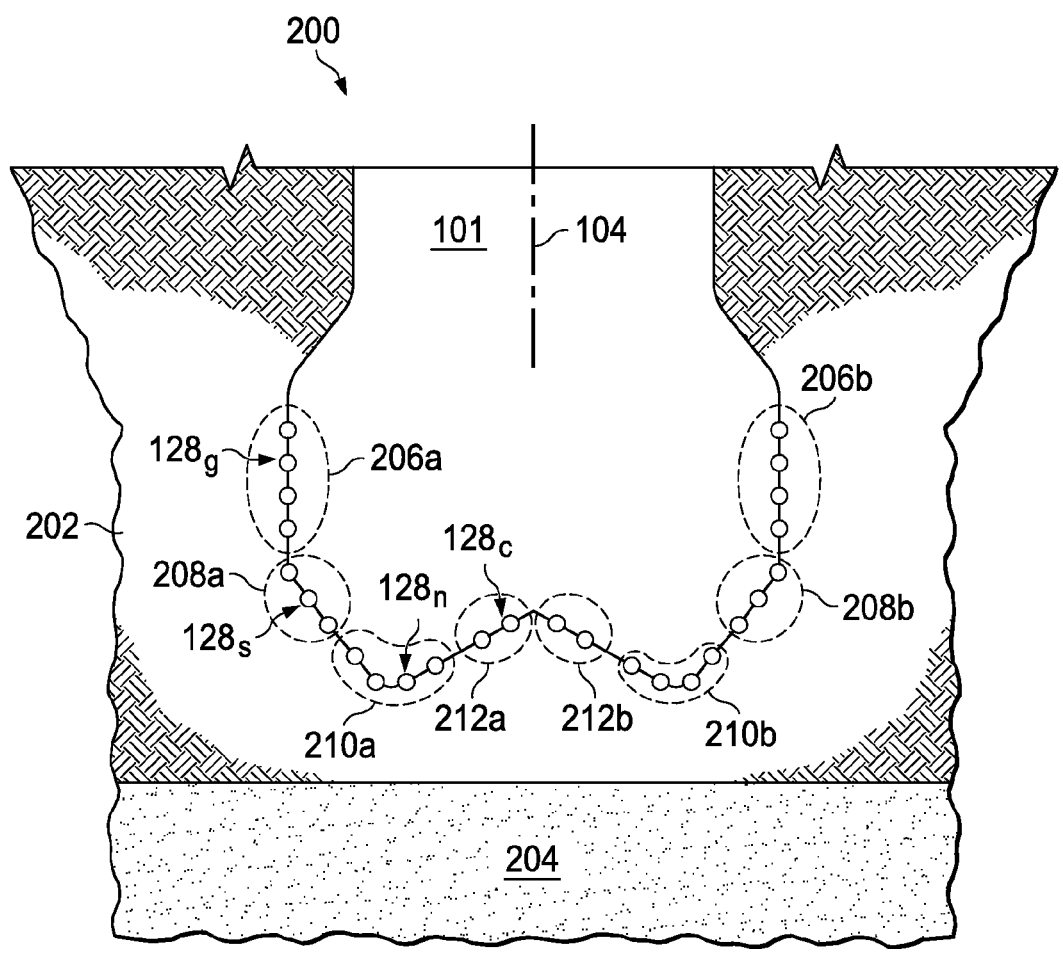
FIG. 2 illustrates a bit face profile of a drill bit configured to form a wellbore through a first formation layer into a second formation layer, in accordance with some embodiments of the present disclosure.

FIG. 2 illustrates bit face profile 200 of drill bit 101 configured to form a wellbore through first formation layer 202 into second formation layer 204, in accordance with some embodiments of the present disclosure. Exterior portions of blades (not expressly shown), cutting elements 128 and DOCCs (not expressly shown) may be projected rotationally onto a radial plane to form bit face profile 200. In the illustrated embodiment, formation layer 202 may be described as "softer" or "less hard" when compared to downhole formation layer 204. As shown in FIG. 2, exterior portions of drill bit 101 that contact adjacent portions of a downhole formation may be described as a "bit face." Bit face profile 200 of drill bit 101 may include various zones or segments. Bit face profile 200 may be substantially symmetric about bit rotational axis 104 due to the rotational projection of bit face profile 200, such that the zones or segments on one side of rotational axis 104 may be substantially similar to the zones or segments on the opposite side of rotational axis 104.

For example, bit face profile 200 may include gage zone 206a located opposite gage zone 206b, shoulder zone 208a located opposite shoulder zone 208b, nose zone 210a located opposite nose zone 210b, and cone zone 212a located opposite cone zone 212b. Cutting elements 128 included in each zone may be referred to as cutting elements of that zone. For example, cutting elements $128_g$ included in gage zones 206 may be referred to as gage cutting elements, cutting elements $128_s$ included in shoulder zones 208 may be referred to as shoulder cutting elements, cutting elements $128_n$ included in nose zones 210 may be referred to as nose cutting elements, and cutting elements $128_c$ included in cone zones 212 may be referred to as cone cutting elements.

Cone zones 212 may be generally convex and may be formed on exterior portions of each blade (e.g., blades 126 as illustrated in FIG. 1) of drill bit 101, adjacent to and extending out from bit rotational axis 104. Nose zones 210 may be generally convex and may be formed on exterior portions of each blade of drill bit 101, adjacent to and extending from each cone zone 212. Shoulder zones 208 may be formed on exterior portions of each blade 126 extending from respective nose zones 210 and may terminate proximate to respective gage zone 206.

According to the present disclosure, a DOCC (not expressly shown) may be configured along bit face profile 200 to provide a substantially constant depth of cut control for cutting elements 128. The design of each DOCC configured to control the depth of cut may be based at least partially on the location of each cutting element 128 with respect to a particular zone of the bit face profile 200 (e.g., gage zone 206, shoulder zone 208, nose zone 210 or cone zone 212). Further, as mentioned above, the various zones of bit face profile 200 may be based on the profile of blades 126 of drill bit 101.

Figure 3A:
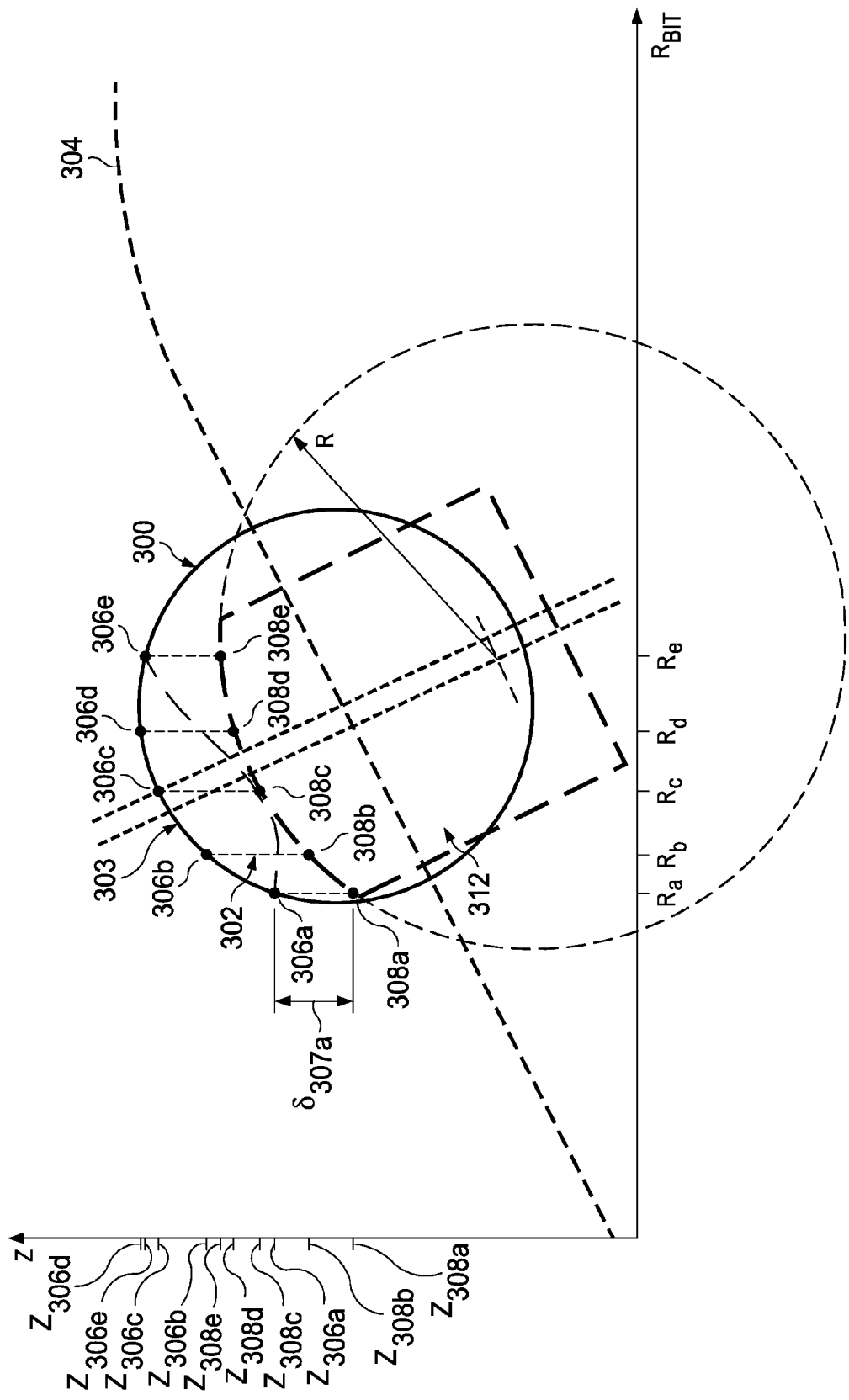
FIG. 3A illustrates a graph of the bit face profile of a cutting element having a cutting zone with a depth of cut that may be controlled by a depth of cut controller (DOCC), in accordance with some embodiments of the present disclosure.
Figure 3B:
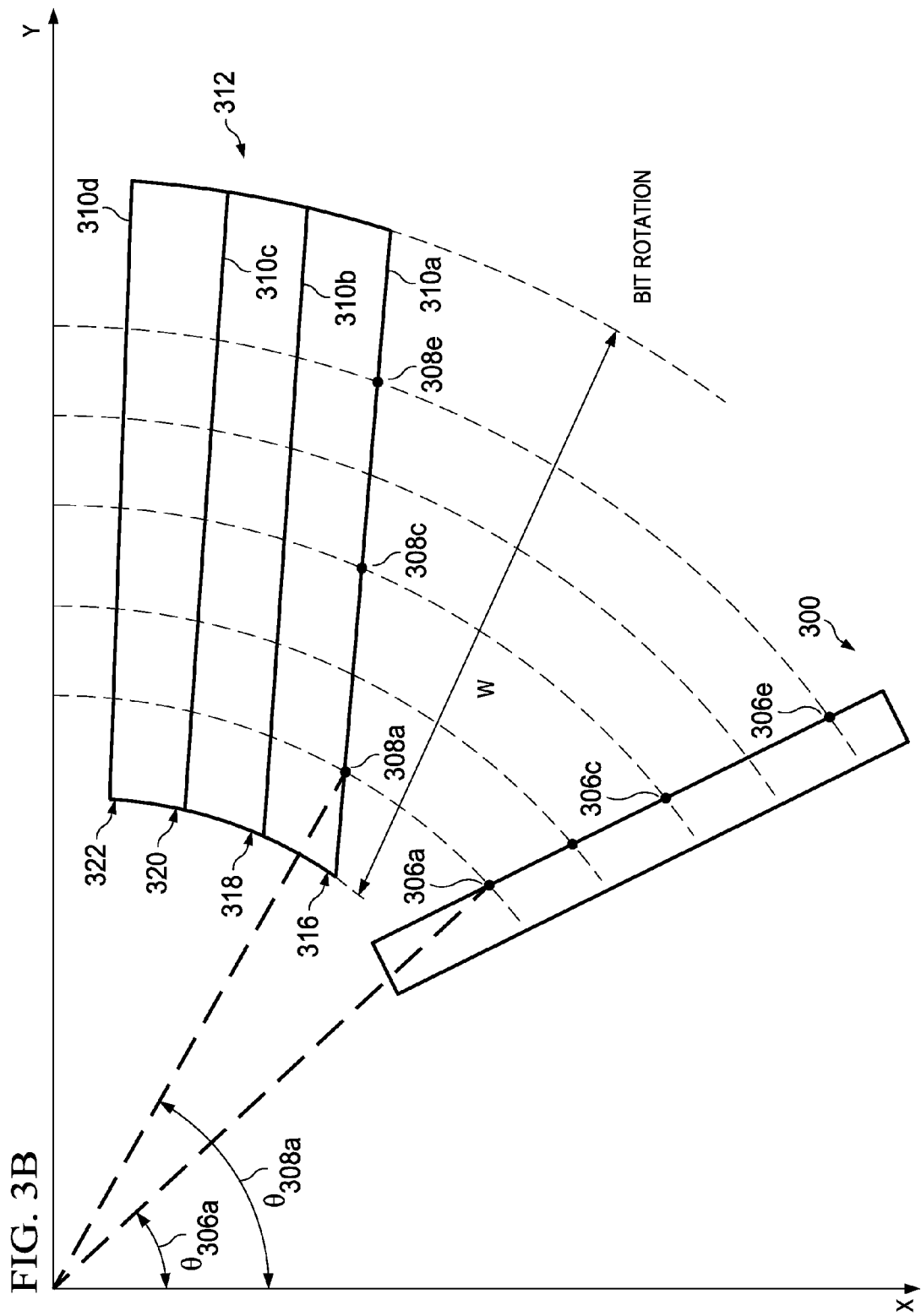
FIG. 3B illustrates a graph of the bit face illustrated in the bit face profile of FIG. 3A, in accordance with some embodiments of the present disclosure.

FIGS. 3A-3C illustrate DOCC 312 that may be designed according to the location of cutting zone 302 of cutting element 300 of a drill bit such as that depicted in FIG. 1, e.g., drill bit 101. The rotational axis of the drill bit corresponding with FIGS. 3A-3C may be associated with the z-axis of a Cartesian coordinate system to define an axial position with respect to the drill bit. Additionally, an xy plane of the coordinate system may correspond with a plane of the bit face of the drill bit that is substantially perpendicular to the rotational axis. Coordinates on the xy plane may be used to define radial and angular coordinates associated with the drill bit of FIGS. 3A-3C.

FIG. 3A illustrates a graph of the bit face profile of cutting element 300 having a cutting zone with a depth of cut that may be controlled by DOCC 312, in accordance with some embodiments of the present disclosure. FIG. 3A illustrates the axial and radial coordinates of cutting element 300 and DOCC 312 configured to control the depth of cut of cutting element 300 based on the location of cutting zone 302 (and its associated cutting edge 303) of cutting element 300. In some embodiments, DOCC 312 may be located on the same blade 304 as cutting element 300, and, in other embodiments, DOCC 312 may be located on a different blade 304 from cutting element 300. Cutting edge 303 of cutting element 300 that corresponds with cutting zone 302 may be divided according to cutlets 306a-306e that have radial and axial positions depicted in FIG. 3A. Additionally, FIG. 3A illustrates the radial and axial positions of control points 308a-308e that may correspond with back edge 316 of DOCC 312, as described in further detail with respect to FIG. 3B.

As depicted in FIG. 3A, the radial coordinates of control points 308a-308e may be determined based on the radial coordinates of cutlets 306a-306e such that each of control points 308a-308e respectively may have substantially the same radial coordinates as cutlets 306a-306e. By basing the radial coordinates of control points 308a-308e on the radial coordinates of cutlets 306a-306e, DOCC 312 may be configured such that its radial swath substantially overlaps the radial swath of cutting zone 302 to control the depth of cut of cutting element 300. Additionally, as discussed in further detail below, the axial coordinates of control points 308a-308e may be determined based on a CDOC, Δ, of cutting element 300 and a corresponding desired axial underexposure, $\delta_{307i}$, of control points 308a-308e with respect to cutlets 306a-306e. Therefore, DOCC 312 may be configured according to the location of cutting zone 302 and cutting edge 303.

FIG. 3B illustrates a graph of the bit face illustrated in the bit face profile of FIG. 3A, in accordance with some embodiments of the present disclosure. DOCC 312 may be designed according to calculated coordinates of cross-sectional lines 310 that may correspond with cross-sections of DOCC 312. For example, the axial, radial and angular coordinates of back edge 316 of DOCC 312 may be determined and designed according to determined axial, radial and angular coordinates of cross-sectional line 310a. In the present disclosure, the term "back edge" may refer to the edge of a component that may be the trailing edge of the component as a drill bit associated with the component rotates. The term "front edge" may refer to the edge of a component that may be the leading edge of the component as the drill bit associated with the component rotates. The axial, radial and angular coordinates of cross-sectional line 310a may be determined according to cutting edge 303 associated with cutting zone 302 of cutting element 300, as described below.

As mentioned above, cutting edge 303 may be divided into cutlets 306a-306e that may have various radial coordinates defining a radial swath of cutting zone 302. A location of cross-sectional line 310a in the xy plane may be selected such that cross-sectional line 310a may be associated with blade 304 where DOCC 312 may be disposed. The location of cross-sectional line 310a may also be selected such that cross-sectional line 310a intersects the radial swath of cutting edge 303. Cross-sectional line 310a may be divided into control points 308a-308e having substantially the same radial coordinates as cutlets 306a-306e, respectively. Therefore, in the illustrated embodiment, the radial swaths of cutlets 306a-306e and control points 308a-308e, respectively, may be substantially the same. With the radial swaths of cutlets 306a-306e and control points 308a-308e being substantially the same, the axial coordinates of control points 308a-308e at back edge 316 of DOCC 312 may be determined for cross-sectional line 310a to better obtain a CDOC control of cutting edge 303 at cutlets 306a-306e, respectively. Accordingly, in some embodiments, the axial, radial and angular coordinates of DOCC 312 at back edge 316 may be designed based on calculated axial, radial and angular coordinates of cross-sectional line 310a such that DOCC 312 may better control the depth of cut of cutting element 300 at cutting edge 303.

The axial coordinates of each control point 308 of cross-sectional line 310a may be determined based on a desired axial underexposure $\delta_{307i}$ between each control point 308 and its respective cutlet 306. The desired axial underexposure $\delta_{307i}$ may be based on the angular coordinates of control point 308 and its respective cutlet 306 and the CDOC Δ of cutting element 300. For example, the desired axial underexposure $\delta_{307a}$ of control point 308a with respect to cutlet 306a (depicted in FIG. 3A) may be based on the angular coordinate ($\theta_{308a}$) of control point 308a, the angular coordinate ($\theta_{306a}$) of cutlet 306a and the CDOC Δ of cutting element 300. The desired axial underexposure $\delta_{307a}$ of control point 308a may be expressed by the following equation:

$$\delta_{307a} = \Delta*(360-(\theta_{308a}-\theta_{306a}))/360$$

In this equation, the CDOC Δ may be expressed as a function of rate of penetration (ROP, ft/hr) and bit rotational speed (RPM) by the following equation:

$$\Delta = ROP/(5*RPM)$$

The CDOC Δ may have a unit of inches per bit revolution. The desired axial underexposures of control points 308b-308e ($\delta_{307b}$-$\delta_{307e}$, respectively) may be similarly determined. In the above equation, $\theta_{306a}$ and $\theta_{308a}$ may be expressed in degrees, and "360" may represent one full revolution of approximately 360 degrees. Accordingly, in instances where $\theta_{306a}$ and $\theta_{308a}$ may be expressed in radians, "360" may be replaced by "$2\pi$." Further, in the above equation, the resultant angle of "($\theta_{308a}-\theta_{306}$)" ($\Delta_\theta$) may be defined as always being positive. Therefore, if resultant angle $\Delta_\theta$ is negative, then $\Delta_\theta$ may be made positive by adding 360 degrees (or $2\pi$ radians) to $\Delta_\theta$.

Additionally, the CDOC Δ may be based on the desired ROP for a given RPM of the drill bit, such that DOCC 312 may be designed to be in contact with the formation at the desired ROP and RPM, and, thus, control the depth of cut of cutting element 300 at the desired ROP and RPM. The CDOC Δ may also be based on the location of cutting element 300 along blade 304. For example, in some embodiments, the CDOC Δ may be different for the cone portion, the nose portion, the shoulder portion the gage portion, or any combination thereof, of the bit profile portions. In the same or alternative embodiments, the CDOC Δ may also vary for subsets of one or more of the mentioned zones along blade 304.

In some instances, cutting elements within the cone portion of a drill bit may wear much less than cutting elements within the nose and gauge portions. Therefore, the CDOC Δ for a cone portion may be less than that for the nose and gauge portions. Thus, in some embodiments, when the cutting elements within the nose and/or gauge portions wear to some level, then DOCC 312 located in the nose and/or gauge portions may begin to control the depth of cut of the drill bit.

Once the desired underexposure $\delta_{307i}$ of each control point 308 is determined, the axial coordinate ($Z_{308i}$) of each control point 308 as illustrated in FIG. 3A may be determined based on the desired underexposure $\delta_i$ of the control point 308 with respect to the axial coordinate ($Z_{306i}$) of its corresponding cutlet 306. For example, the axial coordinate of control point 308a ($Z_{308a}$) may be determined based on the desired underexposure of control point 308a ($\delta_{307a}$) with respect to the axial coordinate of cutlet 306 ($Z_{306a}$), which may be expressed by the following equation:

$$Z_{308a} = Z_{306a} - \delta_{307a}$$

Once the axial, radial and angular coordinates for control points 308 are determined for cross-sectional line 310a, back edge 316 of DOCC 312 may be designed according to these points such that back edge 316 may have approximately the same axial, radial and angular coordinates of cross-sectional line 310a. In some embodiments, the axial coordinates of control points 308 of cross-sectional line 310a may be smoothed by curve fitting technologies. For example, if an MDR is designed based on the calculated coordinates of control points 308, then the axial coordinates of control points 308 may be fit by one or more circular lines. Each of the circular lines may have a center and a radius that may be used to design the MDR. The surface of DOCC 312 at intermediate cross-sections 318 and 320 and at front edge 322 may be similarly designed based on determining radial, angular, and axial coordinates of cross-sectional lines 310b, 310c and 310d, respectively.

Accordingly, the surface of DOCC 312 may be configured at least partially based on the locations of cutting zone 302 and cutting edge 303 of cutting element 300 to improve the depth of cut control of cutting element 300. Additionally, the height and width of DOCC 312 and its placement in the radial plane of the drill bit may be configured based on cross-sectional lines 310, as described in further detail with respect to FIG. 3C. Therefore, the axial, radial and angular coordinates of DOCC 312 may be such that the CDOC control of cutting element 300 may be improved. As shown in FIGS. 3A and 3B, configuring DOCC 312 based on the locations of cutting zone 302 and cutting edge 303 may cause DOCC 312 to be radially aligned with the radial swath of cutting zone 302 but may also cause DOCC 312 to be radially offset from the center of cutting element 300, which may differ from traditional DOCC placement methods.

FIG. 3C illustrates DOCC 312 of FIG. 3A designed according to some embodiments of the present disclosure. DOCC 312 may include surface 314 with back edge 316, first intermediate cross-section 318, second intermediate cross-section 320 and front edge 322. As discussed with respect to FIG. 3B, back edge 316 may correspond with cross-sectional line 310a. Additionally, first intermediate cross-section 318 may correspond with cross-sectional line 310b, second intermediate cross-section 320 may correspond with cross-sectional line 310c and front edge 322 may correspond with cross-sectional line 310d.

As mentioned above, the curvature of surface 314 may be designed according to the axial curvature made by the determined axial coordinates of cross-sectional lines 310. Accordingly, the curvature of surface 314 along back edge 316 may have a curvature that approximates the axial curvature of cross-sectional line 310a; the curvature of surface 314 along first intermediate cross-section 318 may approximate the axial curvature of cross-sectional line 310b; the curvature of surface 314 along second intermediate cross-section 320 may approximate the axial curvature of cross-sectional line 310c; and the curvature of surface 314 along front edge 322 may approximate the axial curvature of cross-sectional line 310d. In the illustrated embodiment and as depicted in FIGS. 3A and 3C, the axial curvature of cross-sectional line 310a may be approximated by the curvature of a circle with a radius "R," such that the axial curvature of back edge 316 may be substantially the same as the circle with radius "R."

The axial curvature of cross-sectional lines 310a-310d may or may not be the same, and accordingly the curvature of surface 314 along back edge 316, intermediate cross-sections 318 and 320, and front edge 322 may or may not be the same. In some instances where the curvature is not the same, the approximated curvatures of surface 314 along back edge 316, intermediate cross-sections 318 and 320, and front edge 322 may be averaged such that the overall curvature of surface 314 is the calculated average curvature. Therefore, the determined curvature of surface 314 may be substantially constant to facilitate manufacturing of surface 314. Additionally, although shown as being substantially fit by the curvature of a single circle, it is understood that the axial curvature of one or more cross-sectional lines 310 may be fit by a plurality of circles, depending on the shape of the axial curvature.

DOCC 312 may have width W that may be large enough to cover the width of cutting zone 302 and may correspond to the length of cross-sectional line 310. Additionally, the height H of DOCC 312, as shown in FIG. 3C, may be configured such that when DOCC 312 is placed on blade 304, the axial positions of surface 314 sufficiently correspond with the calculated axial positions of the cross-sectional lines used to design surface 314. The height H may correspond with the peak point of the curvature of surface 314 that corresponds with a cross-sectional line. For example, the height H of DOCC 312 at back edge 316 may correspond with the peak point of the curvature of DOCC 312 at back edge 316. Additionally, the height H at back edge 316 may be configured such that when DOCC 312 is placed at the calculated radial and angular positions on blade 304 (as shown in FIG. 3B), surface 314 along back edge 316 may have approximately the same axial, angular and radial positions as control points 308a-308e calculated for cross-sectional line 310a.

In some embodiments where the curvature of surface 314 varies according to different curvatures of the cross-sectional lines, the height H of DOCC 312 may vary according to the curvatures associated with the different cross-sectional lines. For example, the height with respect to back edge 316 may be different than the height with respect to front edge 322. In other embodiments where the curvature of the cross-sectional lines is averaged to calculate the curvature of surface 314, the height H of DOCC 312 may correspond with the peak point of the curvature of the entire surface 314.

In some embodiments, the surface of DOCC 312 may be designed using the three dimensional coordinates of the control points of all the cross-sectional lines. The axial coordinates may be smoothed using a two dimensional interpolation method such as a MATLAB® function called interp2.

Modifications, additions or omissions may be made to FIGS. 3A-3C without departing from the scope of the present disclosure. Although a specific number of cross-sectional lines, points along the cross-sectional lines and cutlets are described, it is understood that any appropriate number may be used to configure DOCC 312 to acquire the CDOC control. In one embodiment, the number of cross-sectional lines may be determined by the size and the shape of a DOCC. For example, if a hemi-spherical component is used as a DOCC, (e.g., an MDR) then only one cross sectional line may be needed. If an impact arrestor (semi-cylinder like) is used, then more cross-sectional lines (e.g., at least two) may be used. Additionally, although the curvature of the surface of DOCC 312 is depicted as being substantially round and uniform, it is understood that the surface may have any suitable shape that may or may not be uniform, depending on the calculated surface curvature for the CDOC.

Figure 4:
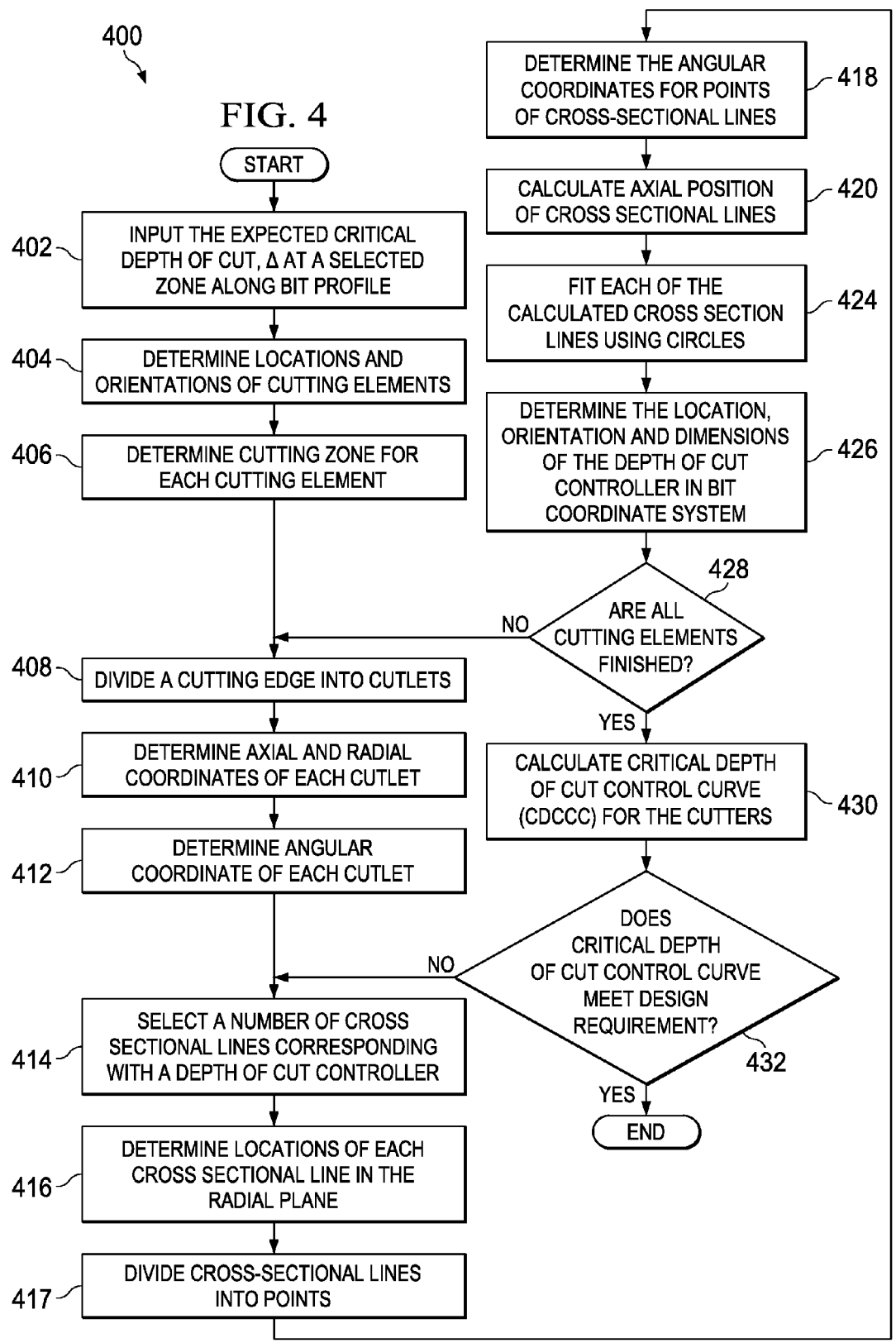
FIG. 4 illustrates a flow chart of an example method for designing one or more DOCCs according to the cutting zones of one or more cutting elements, in accordance with some embodiments of the present disclosure.

FIG. 4 illustrates a flow chart of example method 400 for designing one or more DOCCs (e.g., DOCC 312 of FIGS. 3A-3C) according to the cutting zones of one or more cutting elements, in accordance with some embodiments of the present disclosure. In the illustrated embodiment the cutting structures of the bit including at least the locations and orientations of all cutting elements may have been previously designed. However, in other embodiments, method 400 may include steps for designing the cutting structure of the drill bit.

The steps of method 400 may be performed by various computer programs, models or any combination thereof, configured to simulate and design drilling systems, apparatuses and devices. The programs and models may include instructions stored on a computer readable medium and operable to perform, when executed, one or more of the steps described below. The computer readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer readable media. Collectively, the computer programs and models used to simulate and design drilling systems may be referred to as a "drilling engineering tool" or "engineering tool."

Method 400 may start and, at step 402, the engineering tool may determine a expected CDOC Δ at a selected zone along a bit profile. As mentioned above, the desired CDOC Δ may be based on the desired ROP for a given RPM, such that the DOCCs within the bit profile zone (e.g., cone zone, shoulder zone, etc.) may be designed to be in contact with the formation at the desired ROP and RPM, and, thus, control the depth of cut of cutting elements in the cutting zone at the desired ROP and RPM.

At step 404, the locations and orientations of cutting elements within the selected zone may be determined. At step 406, the engineering tool may create a 3D cutter/rock interaction model that may determine the cutting zone for each cutting element in the design based at least in part on the expected CDOC Δ for each cutting element. As noted above, the cutting zone and cutting edge for each cutting element may be based on the axial and radial coordinates of the cutting element.

At step 408, using the engineering tool, the cutting edge within the cutting zone of each of the cutting elements may be divided into cutting points ("cutlets") of the bit face profile. For illustrative purposes, the remaining steps are described with respect to designing a DOCC with respect to one of the cutting elements, but it is understood that the steps may be followed for each DOCC of a drill bit, either at the same time or sequentially.

At step 410, the axial and radial coordinates for each cutlet along the cutting edge of a selected cutting element associated with the DOCC may be calculated with respect to the bit face (e.g., the axial and radial coordinates of cutlets 306 of FIGS. 3A and 3B may be determined). Additionally, at step 412, the angular coordinate of each cutlet may be calculated in the radial plane of the bit face.

At step 414, the locations of a number of cross-sectional lines in the radial plane corresponding to the placement and design of a DOCC associated with the cutting element may be determined (e.g., cross-sectional lines 310 associated with DOCC 312 of FIGS. 3A-3C). The cross-sectional lines may be placed within the radial swath of the cutting zone of the cutting element such that they intersect the radial swath of the cutting zone, and, thus have a radial swath that substantially covers the radial swath of the cutting zone. In some embodiments, the length of the cross-sectional lines may be based on the width of the cutting zone and cutting edge such that the radial swath of the cutting zone and cutting edge is substantially intersected by the cross-sectional lines. Therefore, as described above, the cross-sectional lines may be used to model the shape, size and configuration of the DOCC such that the DOCC controls the depth of cut of the cutting element at the cutting edge of the cutting element.

Further, the number of cross-sectional lines may be determined based on the desired size of the DOCC to be designed as well as the desired precision in designing the DOCC. For example, the larger the DOCC, the more cross-sectional lines may be used to adequately design the DOCC within the radial swath of the cutting zone and thus provide a more consistent depth of cut control for the cutting zone.

At step 416, the locations of the cross-sectional lines disposed on a blade may be determined (e.g., the locations of cross-sectional lines 310 in FIG. 3B) such that the radial coordinates of the cross-sectional lines substantially intersect the radial swath of the cutting zone of the cutting element. At step 417, each cross-sectional line may be divided into points with radial coordinates that substantially correspond with the radial coordinates of the cutlets determined in step 408 (e.g., cross-sectional line 610a divided into points 308 of FIGS. 3A-3C). At step 418, the engineering tool may be used to determine the angular coordinate for each point of each cross-sectional line in a plane substantially perpendicular to the bit rotational axis (e.g., the xy plane of FIGS. 3A-3C). At step 420, the axial coordinate for each point on each cross-sectional line may also be determined by determining a desired axial underexposure between the cutlets of the cutting element and each respective point of the cross-sectional lines corresponding with the cutlets, as described above with respect to FIGS. 3A-3C. After determining the axial underexposure for each point of each cross-sectional line, the axial coordinate for each point may be determined by applying the underexposure of each point to the axial coordinate of the cutlet associated with the point, also as described above with respect to FIGS. 3A-3C.

After calculating the axial coordinate of each point of each cross-sectional line based on the cutlets of a cutting zone of an associated cutting element, (e.g., the axial coordinates of points 308a-308e of cross-sectional line 310a based on cutlets 306a-306e of FIGS. 3A-3C) at step 420, method 400 may proceed to steps 424 and 426 where a DOCC may be designed according to the axial, angular, and radial coordinates of the cross-sectional lines.

In some embodiments, at step 424, for each cross-sectional line, the curve created by the axial coordinates of the points of the cross-sectional line may be fit to a portion of a circle. Accordingly, the axial curvature of each cross-sectional line may be approximated by the curvature of a circle. Thus, the curvature of each circle associated with each cross-sectional line may be used to design the three-dimensional surface of the DOCC to approximate a curvature for the DOCC that may improve the depth of cut control. In some embodiments, the surface of the DOCC may be approximated by smoothing the axial coordinates of the surface using a two dimensional interpolation method, such as a MATLAB® function called interp2.

In step 426, the width of the DOCC may also be configured. In some embodiments, the width of the DOCC may be configured to be as wide as the radial swath of the cutting zone of a corresponding cutting element. Thus, the cutting zone of the cutting element may be located within the rotational path of the DOCC such that the DOCC may provide the appropriate depth of cut control for the cutting element. Further, at step 426, the height of the DOCC may be designed such that the surface of the DOCC is approximately at the same axial position as the calculated axial coordinates of the points of the cross-sectional lines. Therefore, the engineering tool may be used to design a DOCC according to the location of the cutting zone and cutting edge of a cutting element.

After determining the location, orientation and dimensions of a DOCC at step 426, method 400 may proceed to step 428. At step 428, it may be determined if all the DOCCs have been designed. If all of the DOCCs have not been designed, method 400 may repeat steps 408-426 to design another DOCC based on the cutting zones of one or more other cutting elements.

At step 430, once all of the DOCCs are designed, a CDOC control curve (CDCCC) may be calculated using the engineering tool. The CDCCC may be used to determine how even the depth of cut is throughout the desired zone. At step 432, using the engineering tool, it may be determined whether the CDCCC indicates that the depth of cut control meets design requirements. If the depth of cut control meets design requirements, method 400 may end. Calculation of the CDCCC is described in further detail with respect to FIGS. 7A-7C and FIG. 8.

If the depth of cut control does not meet design requirements, method 400 may return to step 414, where the design parameters may be changed. For example, the number of cross-sectional lines may be increased to better design the surface of the DOCC according to the location of the cutting zone and cutting edge. Further, the angular coordinates of the cross-sectional line may be changed. In other embodiments, if the depth of cut control does not meet design requirements, method 400 may return to step 408 to determine a larger number of cutlets for dividing the cutting edge, and thus better approximate the cutting edge. Additionally, as described further below, the DOCC may be designed according to the locations of the cutting zones and cutting edges of more than one cutting element that may be within the radial swath of the DOCC.

Additionally, method 400 may be repeated for configuring one or more DOCCs to control the depth of cut of cutting elements located within another zone along the bit profile by inputting another expected CDOC, Δ, at step 402. Therefore, one or more DOCCs may be configured for the drill bit within one or more zones along the bit profile of a drill bit according to the locations of the cutting edges of the cutting elements to improve the depth of cut control of the drill bit.

Modifications, additions or omissions may be made to method 400 without departing from the scope of the disclosure. For example, the order of the steps may be changed. Additionally, in some instances, each step may be performed with respect to an individual DOCC and cutting element until that DOCC is designed for the cutting element and then the steps may be repeated for other DOCCs or cutting elements. In other instances, each step may be performed with respect to each DOCC and cutting element before moving onto the next step. Similarly, steps 416 through 424 may be done for one cross-sectional line and then repeated for another cross-sectional line, or steps 416 through 424 may be performed for each cross-sectional line at the same time, or any combination thereof. Further, the steps of method 400 may be executed simultaneously, or broken into more steps than those described. Additionally, more steps may be added or steps may be removed without departing from the scope of the disclosure.

Once one or more DOCCs are designed using method 400, a drill bit may be manufactured according to the calculated design constraints to provide a more constant and even depth of cut control of the drill bit. The constant depth of cut control may be based on the placement, dimensions and orientation of DOCCs, such as impact arrestors, in both the radial and axial positions with respect to the cutting zones and cutting edges of the cutting elements. In the same or alternative embodiments, the depth of cut of a cutting element may be controlled by a blade.

Figure 5A:
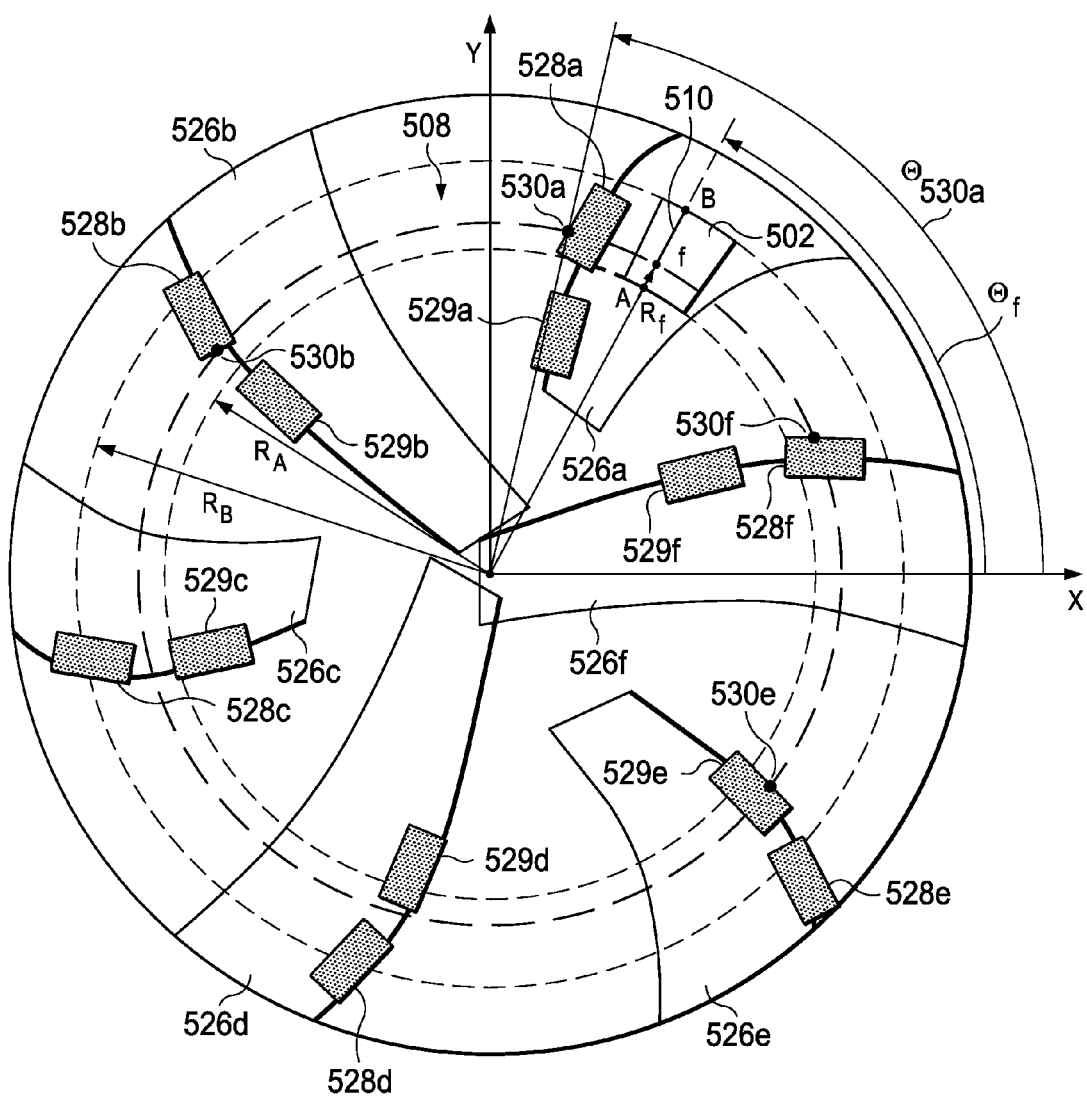
FIG. 5A illustrates the face of a drill bit with a DOCC configured in accordance with some embodiments of the present disclosure.
Figure 5B:
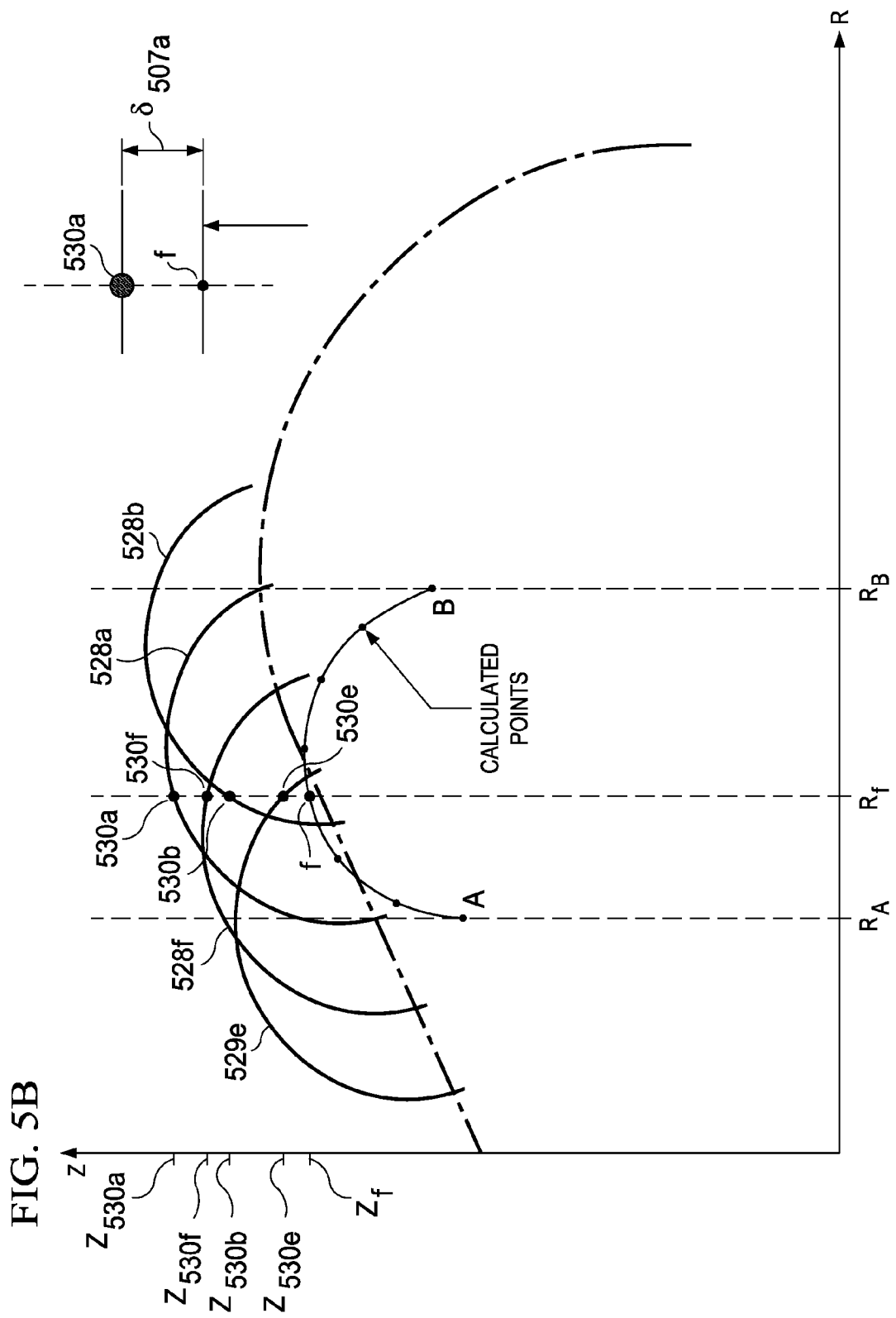
FIG. 5B illustrates the desired underexposure of a control point with respect to each intersection point shown on FIG. 5A, in accordance with embodiments of the present disclosure.
Figure 5C:
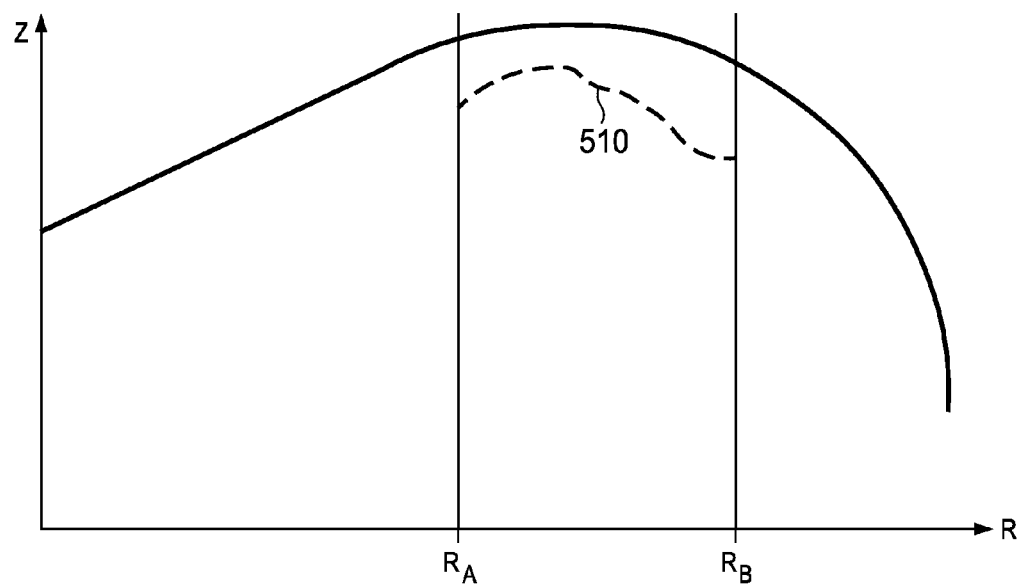
FIG. 5C illustrates an example of the axial coordinates and curvature of a cross-sectional line configured such that a DOCC may control the depth of cut of a drill bit to a critical depth of cut (CDOC), in accordance with some embodiments of the present disclosure.

FIGS. 5A-5C illustrate DOCC 502 configured to control the depth of cut of cutting elements 528 and 529 located within swath 508 of drill bit 501. FIG. 5A illustrates the face of drill bit 501 with DOCC 502 configured in accordance with some embodiments of the present disclosure. Drill bit 501 may include blades 526, outer cutting elements 528 and inner cutting elements 529 disposed on blades 526. In the illustrated embodiment, DOCC 502 may be located on blade 526a and configured to control the depth of cut of all cutting elements 528 and 529 located within swath 508 of drill bit 501.

A desired CDOC $\Delta_1$ per revolution (shown in FIG. 5D) may be determined for the cutting elements 528 and 529 within radial swath 508 of drill bit 501. Radial swath 508 may be located between first radial coordinate $R_A$ and second radial coordinate $R_B$. $R_A$ and $R_B$ may be determined based on the available sizes that may be used for DOCC 502. For example, if an MDR is used as DOCC 502, then the width of radial swath 508 (e.g., $R_B - R_A$) may be equal to the diameter of the MDR. As another example, if an impact arrestor is selected as DOCC 502, then the width of radial swath 508 may be equal to the width of the impact arrestor. $R_A$ and $R_B$ may also be determined based on the dull conditions of previous bit runs. In some instances radial swath 508 may substantially include the entire bit face such that $R_A$ is approximately equal to zero and $R_B$ is approximately equal to the radius of drill bit 508.

Once radial swath 508 is determined, the angular location of DOCC 502 within radial swath 508 may be determined. In the illustrated embodiment where only one DOCC 502 is depicted, DOCC 502 may be placed on any blade (e.g., blade 526a) based on the available space on that blade for placing DOCC 502. In alternative embodiments, if more than one DOCC is used to provide a CDOC control for cutting elements 528 and 529 located within swath 508 (e.g., all cutting elements 528 and 529 located within the swath 508), the angular coordinates of the DOCCs may be determined based on a "rotationally symmetric rule" in order to reduce frictional imbalance forces. For example, if two DOCCs are used, then one DOCC may be placed on blade 526a and another DOCC may be placed on blade 526d. If three DOCCs are used, then a first DOCC may be placed on blade 526a, a second DOCC may be placed on blade 526c and a third DOCC may be placed on blade 526e. The determination of angular locations of DOCCs is described below with respect to various embodiments.

Returning to FIG. 5A, once the radial and the angular locations of DOCC 502 are determined, the x and y coordinates of any point on DOCC 502 may also be determined. For example, the surface of DOCC 502 in the xy plane of FIG. 5A may be meshed into small grids. The surface of DOCC 502 in the xy plane of FIG. 5A may also be represented by several cross sectional lines. For simplicity, each cross sectional line may be selected to pass through the bit axis or the origin of the coordinate system. Each cross sectional line may be further divided into several points. With the location on blade 526a for DOCC 502 selected, the x and y coordinates of any point on any cross sectional line associated with DOCC 502 may be easily determined and the next step may be to calculate the axial coordinates, z, of any point on a cross sectional line.

In the illustrated embodiment, DOCC 502 may be placed on blade 526a and configured to have a width that corresponds to radial swath 508. Additionally, cross sectional line 510 associated with DOCC 502 may be selected, and in the illustrated embodiment may be represented by line "AB." In some embodiments, cross-sectional line 510 may be selected such that all points along cross-sectional line 510 have the same angular coordinates. The inner end "A" of cross-sectional line 510 may have a distance from the center of bit 501 in the xy plane indicated by radial coordinate $R_A$ and the outer end "B" of cross-sectional line 510 may have a distance from the center of drill bit 501 indicated by radial coordinate $R_B$, such that the radial position of cross-sectional line 510 may be defined by $R_A$ and $R_B$. Cross-sectional line 510 may be divided into a series of points between inner end "A" and outer end "B" and the axial coordinates of each point may be determined based on the radial intersection of each point with one or more cutting edges of cutting elements 528 and 529, as described in detail below. In the illustrated embodiment, the determination of the axial coordinate of a control point "f" along cross-sectional line 510 is described. However, it is understood that the same procedure may be applied to determine the axial coordinates of other points along cross-sectional line 510 and also to determine the axial coordinates of other points of other cross-sectional lines that may be associated with DOCC 502.

The axial coordinate of control point "f" may be determined based on the radial and angular coordinates of control point "f" in the xy plane. For example, the radial coordinate of control point "f" may be the distance of control point "f" from the center of drill bit 501 as indicated by radial coordinate $R_f$. Once $R_f$ is determined, intersection points 530 associated with the cutting edges of one or more cutting elements 528 and/or 529 having radial coordinate $R_f$ may be determined. Accordingly, intersection points 530 of the cutting elements may have the same rotational path as control point "f" and, thus, may have a depth of cut that may be affected by control point "f" of DOCC 502. In the illustrated embodiment, the rotational path of control point "f" may intersect the cutting edge of cutting element 528a at intersection point 530a, the cutting edge of cutting element 528b at intersection point 530b, the cutting edge of cutting element 529e at intersection point 530e and the cutting edge of cutting element 528f at intersection point 530f.

The axial coordinate of control point "f" may be determined according to a desired underexposure ($\delta_{507i}$) of control point "f" with respect to each intersection point 530. FIG. 5B illustrates the desired underexposure $\delta_{507i}$ of control point "f" with respect to each intersection point 530 shown on FIG. 5A, in accordance with embodiments of the present disclosure. The desired underexposure $\delta_{507i}$ of control point "f" with respect to each intersection point 530 may be determined based on the desired CDOC $\Delta_1$ and the angular coordinates of control point "f" ($\theta_f$) and each point 530 ($\theta_{530i}$). For example, the desired underexposure of control point "f" with respect to intersection point 530a may be expressed by the following equation:

$$\delta_{507a} = \Delta_1 * (360 - (\theta_f - \theta_{530a}))/360$$

In the above equation, $\theta_f$ and $\theta_{530a}$ may be expressed in degrees, and "360" may represent one full revolution of approximately 360 degrees. Accordingly, in instances where $\theta_f$ and $\theta_{530a}$ may be expressed in radians, "360" may be replaced by "$2\pi$". Further, in the above equation, the resultant angle of "$(\theta_f - \theta_{530a})$" ($\Delta_\theta$) may be defined as always being positive. Therefore, if resultant angle $\Delta_\theta$ is negative, then $\Delta_\theta$ may be made positive by adding 360 degrees (or $2\pi$ radians) to $\Delta_\theta$. The desired underexposure of control point "f" with respect to points 530b, 530e and 530f, ($\delta_{507b}$, $\delta_{507e}$, $\delta_{507f}$, respectively) may be similarly determined.

Once the desired underexposure of control point "f" with respect to each intersection point is determined ($\delta_{507i}$), the axial coordinate of control point "f" may be determined. The axial coordinate of control point "f" may be determined based on the difference between the axial coordinates of each intersection point 530 and the desired underexposure with respect to each intersection point 530. For example, in FIG. 5B, the axial location of each point 530 may correspond to a coordinate on the z-axis, and may be expressed as a z-coordinate ($Z_{530i}$). To determine the corresponding z-coordinate of control point "f" ($Z_f$), a difference between the z-coordinate $Z_{530i}$ and the corresponding desired underexposure $\delta_{507i}$ for each intersection point 530 may be determined. The maximum value of the differences between $Z_{530i}$ and $\delta_{507i}$ may be the axial or z-coordinate of control point "f" ($Z_f$). For the current example, $Z_f$ may be expressed by the following equation:

$$Z_f = \max[(Z_{530a} - \delta_{507a}), (Z_{530b} - \delta_{507}), (Z_{530e} - \delta_{507}), (Z_{530f} - \delta_{507f})]$$

Accordingly, the axial coordinate of control point "f" may be determined based on the cutting edges of cutting elements 528a, 528b, 529e and 528f. The axial coordinates of other points (not expressly shown) along cross-sectional line 510 may be similarly determined to determine the axial curvature and coordinates of cross-sectional line 510. FIG. 5C illustrates an example of the axial coordinates and curvature of cross-sectional line 510 configured such that DOCC 502 may control the depth of cut of drill bit 501 to CDOC $\Delta_1$, in accordance with some embodiments of the present disclosure. Cross-sectional line 510 may be determined within the radial swath defined by $R_A$ and $R_B$.

The above mentioned process may be repeated to determine the axial coordinates and curvature of other cross-sectional lines associated with DOCC 502 such that DOCC 502 may be designed according to the coordinates of the cross-sectional lines. At least one cross sectional line may be used to design a three dimensional surface of DOCC 502. Additionally, in some embodiments, a cross sectional line may be selected such that all the points on the cross sectional line have the same angular coordinate. Accordingly, DOCC 502 may provide depth of cut control to substantially obtain the CDOC $\Delta_1$ within the radial swath defined by $R_A$ and $R_B$.

To more easily manufacture DOCC 502, in some instances, the axial coordinates of cross-sectional line 510 and any other cross-sectional lines may be smoothed by curve fitting technologies. For example, if DOCC 502 is designed as an MDR based on calculated cross sectional line 510, then cross sectional line 510 may be fit by one or more circular lines. Each of the circular lines may have a center and a radius that are used to design the MDR. As another example, if DOCC 502 is designed as an impact arrestor, a plurality of cross-sectional lines 510 may be used. Each of the cross-sectional lines may be fit by one or more circular lines. Two fitted cross-sectional lines may form the two ends of the impact arrestor similar to that shown in FIG. 3C.

Figure 5D:
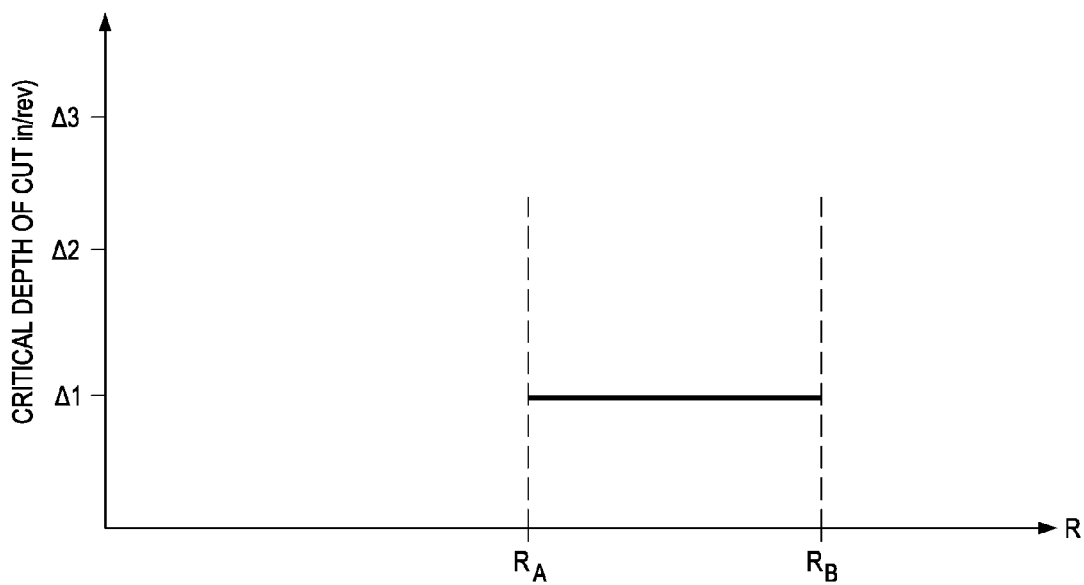
FIG. 5D illustrates a critical depth of cut control curve (CDCCC) of the drill bit of FIGS. 5A-5C, in accordance with some embodiments of the present disclosure.

FIG. 5D illustrates a CDCCC of drill bit 501 of FIGS. 5A-5C, in accordance with some embodiments of the present disclosure. The CDCCC indicates that the CDOC of radial swath 508 between radial coordinates $R_A$ and $R_B$ may be substantially even and constant. Therefore, FIG. 5D indicates that the CDOC $\Delta_1$ of drill bit 501, as controlled by DOCC 502, may be substantially constant by taking in account all the cutting elements with depths of cut that may be affected by DOCC 502 and design DOCC 502 accordingly.

Modifications, additions, or omissions may be made to FIGS. 5A-5D without departing from the scope of the present disclosure. For example, although DOCC 502 is depicted as having a particular shape, DOCC 502 may have any appropriate shape. Additionally, it is understood that any number of cross-sectional lines and points along the cross-sectional lines may be selected to determine a desired axial curvature of DOCC 502. Further, although only one DOCC 502 is depicted on drill bit 501, drill bit 501 may include any number of DOCCs configured to control the depth of cut of the cutting elements associated with any number of radial swaths of drill bit 501. Further, the CDOC of drill bit 501 may vary according to the radial coordinate (distance from the center of drill bit 501 in the radial plane).

Figure 6B:
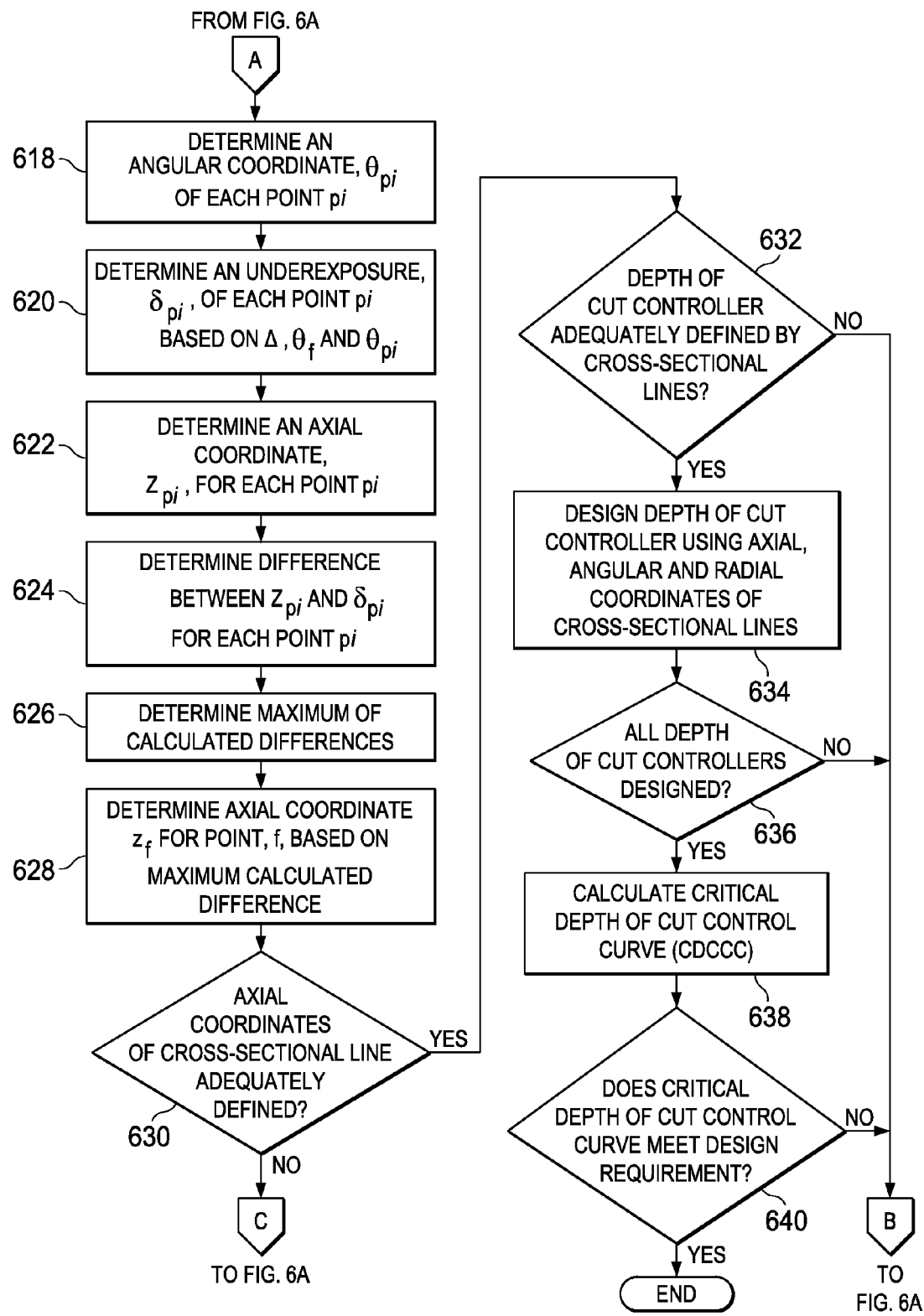

FIGS. 6A and 6B illustrate a flow chart of example method 600 for configuring a DOCC (e.g., DOCC 502 of FIGS. 5A-5B), in accordance with some embodiments of the present disclosure. In the illustrated embodiment the cutting structures of the bit including at least the locations and orientations of all cutting elements may have been previously designed. However in other embodiments, method 600 may include steps for designing the cutting structure of the drill bit.

The steps of method 600 may be performed by various computer programs, models or any combination thereof, configured to simulate and design drilling systems, apparatuses and devices. The programs and models may include instructions stored on a computer readable medium and operable to perform, when executed, one or more of the steps described below. The computer readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer readable media. Collectively, the computer programs and models used to simulate and design drilling systems may be referred to as a "drilling engineering tool" or "engineering tool."

Method 600 may start, and at step 602, the engineering tool may determine an expected CDOC (Δ) at a selected zone (e.g., cone zone, nose zone, shoulder zone, gage zone, etc.) or within a particular radial swath along a bit profile. The zone may be associated with a radial swath of the drill bit. At step 604, the locations and orientations of cutting elements located within the swath may be determined. Additionally, at step 606 the engineering tool may create a 3D cutter/rock interaction model that may determine the cutting zone and the cutting edge for each cutting element.

At step 608, the engineering tool may select a cross-sectional line (e.g., cross-sectional line 510) that may be associated with a DOCC that may be configured to control the depth of cut of a radial swath (e.g., radial swath 508 of FIGS. 5A-5B) of the drill bit. At step 610, the location of the cross-sectional line in a plane perpendicular to the rotational axis of the drill bit (e.g., the xy plane of FIG. 5A) may be determined. The location of the cross-sectional line may be selected such that the cross-sectional line intersects the radial swath and is located on a blade (e.g., cross-sectional line 510 intersects radial swath 508 and is located on blade 526*a* in FIG. 5A).

At step 611, a control point "f" along the cross-sectional line may be selected. Control point "f" may be any point that is located along the cross-sectional line and that may be located within the radial swath. At step 612, the radial coordinate $R_f$ of control point "f" may be determined. $R_f$ may indicate the distance of control point "f" from the center of the drill bit in the radial plane. Intersection points pi of the cutting edges of one or more cutting elements having radial coordinate $R_f$ may be determined at step 614. At step 616, an angular coordinate of control point "f" ($\theta_f$) may be determined and at step 618 an angular coordinate of each intersection point pi ($\theta_{pi}$) may be determined.

The engineering tool may determine a desired underexposure of each point pi ($\delta_{pi}$) with respect to control point "f" at step 620. As explained above with respect to FIG. 5B, the underexposure $\delta_{pi}$ of each intersection point pi may be determined based on a desired CDOC Δ of the drill bit in the rotational path of point "f." The underexposure $\delta_{pi}$ for each intersection point pi may also be based on the relationship of angular coordinate $\theta_f$ with respect to the respective angular coordinate $\theta_{pi}$.

At step 622, an axial coordinate for each intersection point pi ($Z_{pi}$) may be determined and a difference between $Z_{pi}$ and the respective underexposure $\delta_{pi}$ may be determined at step 624, similar to that described above in FIGS. 5A-5D (e.g., $Z_{pi} - \delta_{pi}$). In one embodiment, the engineering tool may determine a maximum of the difference between $Z_{pi}$ and $\delta_{pi}$ calculated for each intersection point pi at step 626. At step 628, the axial coordinate of control point "f" ($Z_f$) may be determined based on the maximum calculated difference, similar to that described above in FIGS. 5A-5D.

At step 630, the engineering tool may determine whether the axial coordinates of enough control points of the cross-sectional line (e.g., control point "f") have been determined to adequately define the axial coordinate of the cross-sectional line. If the axial coordinates of more control points are needed, method 600 may return to step 611 where the engineering tool may select another control point along the cross-sectional line, otherwise, method 600 may proceed to step 632. The number of control points along a cross sectional line may be determined by a desired distance between two neighbor control points, (dr), and the length of the cross sectional line, (Lc). For example, if Lc is approximately 1 inch, and dr is approximately 0.1," then the number of control points may be Lc/dr+1=11. In some embodiments, dr may be between approximately 0.01" to 0.2".

If the axial coordinates of enough cross-sectional lines have been determined, the engineering tool may proceed to step 632, otherwise, the engineering tool may return to step 611. At step 632, the engineering tool may determine whether the axial, radial and angular coordinates of a sufficient number of cross-sectional lines have been determined for the DOCC to adequately define the DOCC. The number of cross-sectional lines may be determined by the size and the shape of a DOCC. For example, if a hemispherical component (e.g., an MDR) is selected as a DOCC, then only one cross sectional line may be used. If an impact arrestor (semi-cylinder like) is selected, then a plurality of cross-sectional lines may be used. If a sufficient number have been determined, method 600 may proceed to step 634, otherwise method 600 may return to step 608 to select another cross-sectional line associated with the DOCC.

At step 634, the engineering tool may use the axial, angular and radial coordinates of the cross-sectional lines to configure the DOCC such that the DOCC may have substantially the same axial, angular and radial coordinates as the cross-sectional lines. In some instances, the three dimensional surface of the DOCC that may correspond to the axial curvature of the cross-sectional lines may be designed by smoothing the axial coordinates of the surface using a two dimensional interpolation method such as the MATLAB® function called interp2.

At step 636, the engineering tool may determine whether all of the desired DOCCs for the drill bit have been designed. If no, method 600 may return to step 608 to select a cross-sectional line for another DOCC that is to be designed; if yes, method 600 may proceed to step 638, where the engineering tool may calculate a CDCCC for the drill bit, as explained in more detail below.

The engineering tool may determine whether the CDCCC indicates that the drill bit meets the design requirements at step 640. If no, method 600 may return to step 608 and various changes may be made to the design of one or more DOCCs of the drill bit. For example, the number of control points "f" may be increased, the number of cross-sectional lines for a DOCC may be increased, or any combination thereof. The angular locations of cross sectional lines may also be changed. Additionally, more DOCCs may be added to improve the CDCCC. If the CDCCC indicates that the drill bit meets the design requirements, method 600 may end. Consequently, method 600 may be used to design and configure a DOCC according to the cutting edges of all cutting elements within a radial swath of a drill bit such that the drill bit may have a substantially constant depth of cut as controlled by the DOCC.

Method 600 may be repeated for designing and configuring another DOCC within the same radial swath at the same expected depth of cut beginning at step 608. Method 600 may also be repeated for designing and configuring another DOCC within another radial swath of a drill bit by inputting another expected CDOC, Δ, at step 602. Modifications, additions, or omissions may be made to method 600 without departing from the scope of the present disclosure. For example, each step may include additional steps. Additionally, the order of the steps as described may be changed. For example, although the steps have been described in sequential order, it is understood that one or more steps may be performed at the same time.

Figure 7A:
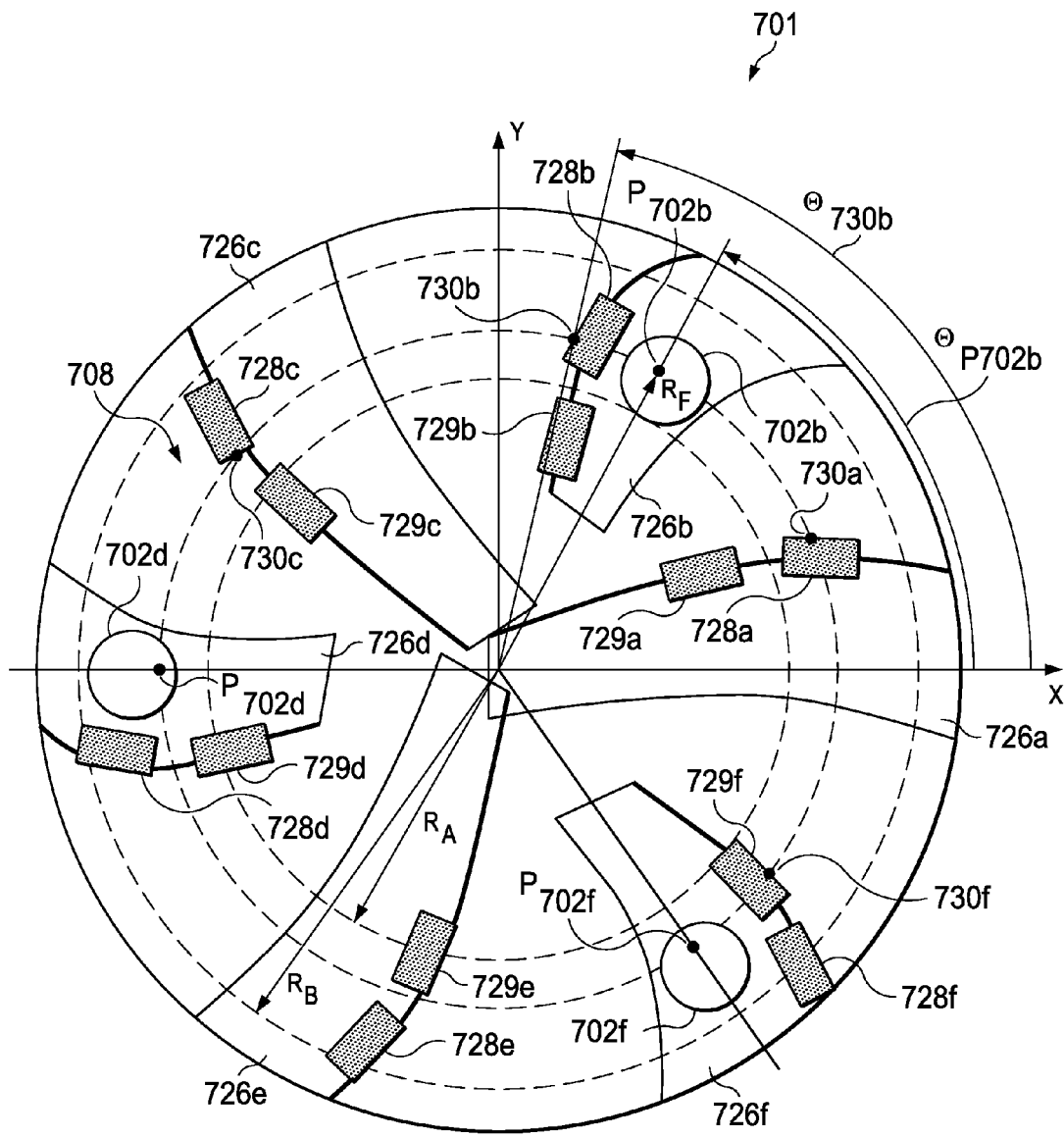
FIG. 7A illustrates the face of a drill bit for which a CDCCC may be determined, in accordance with some embodiments of the present disclosure.
Figure 7B:
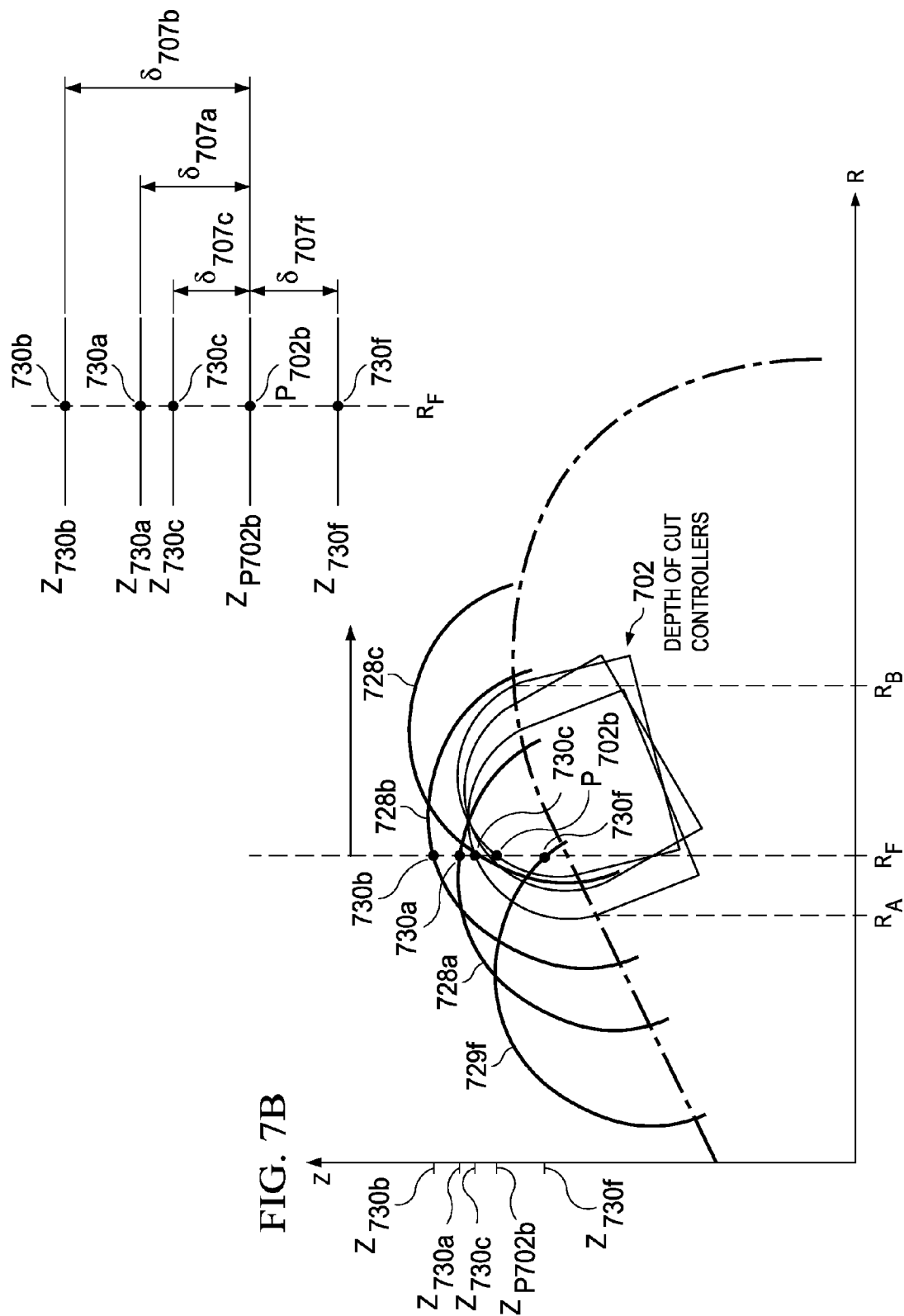
FIG. 7B illustrates a bit face profile of the drill bit depicted in FIG. 7A, in accordance with some embodiments of the present disclosure.

FIG. 7A illustrates the face of a drill bit 701 for which a CDCCC may be determined, in accordance with some embodiments of the present disclosure. FIG. 7B illustrates a bit face profile of drill bit 701 of FIG. 7A, in accordance with some embodiments of the present disclosure. Drill bit 701 may include a plurality of blades 726 that may include cutting elements 728 and 729. Additionally, blades 726b, 726d and 726f may include DOCC 702b, 702d and 702f, respectively, that may be configured to control the depth of cut of drill bit 701. DOCCs 702b, 702d and 702f may be configured and designed according to the desired CDOC of drill bit 701 within a radial swath intersected by DOCCs 702b, 702d and 702f as described in detail above.

As mentioned above, the CDOC of drill bit 701 may be determined for a radial location along drill bit 701. For example, drill bit 701 may include a radial coordinate $R_F$ that may intersect with DOCC 702b at a control point $P_{702b}$, DOCC 702d at a control point $P_{702d}$, and DOCC 702f at a control point $P_{702f}$. Additionally, radial coordinate $R_F$ may intersect cutting elements 728a, 728b, 728c, and 729f at cutlet points 730a, 730b, 730c, and 730f, respectively, of the cutting edges of cutting elements 728a, 728b, 728c, and 729f, respectively.

The angular coordinates of control points $P_{702b}$, $P_{702d}$ and $P_{702f}$ ($\theta_{P702b}$, $\theta_{P702d}$ and $\theta_{P702f}$, respectively) may be determined along with the angular coordinates of cutlet points 730a, 730b, 730c and 730f ($\theta_{730a}$, $\theta_{730b}$, $\theta_{730c}$ and $\theta_{730f}$, respectively). A depth of cut control provided by each of control points $P_{702b}$, $P_{702d}$ and $P_{702f}$ with respect to each of cutlet points 730a, 730b, 730c and 730f may be determined. The depth of cut control provided by each of control points $P_{702b}$, $P_{702d}$ and $P_{702f}$ may be based on the underexposure ($\delta_{707i}$ depicted in FIG. 7B) of each of points $P_{702i}$ with respect to each of cutlet points 730 and the angular coordinates of points $P_{702i}$ with respect to cutlet points 730.

For example, the depth of cut of cutting element 728b at cutlet point 730b controlled by point $P_{702b}$ of DOCC 702b ($\Delta_{730b}$) may be determined using the angular coordinates of point $P_{702b}$ and cutlet point 730b ($\theta_{P702b}$ and $\theta_{730b}$, respectively), which are depicted in FIG. 7A. Additionally, $\Delta_{730b}$ may be based on the axial underexposure ($\delta_{707b}$) of the axial coordinate of point $P_{702b}$ ($Z_{P702b}$) with respect to the axial coordinate of intersection point 730b ($Z_{730b}$), as depicted in FIG. 7B. In some embodiments, $\Delta_{730b}$ may be determined using the following equations:

$$\Delta_{730b} = \delta_{707b} \cdot 360/(360 - (\theta_{P702b} - \theta_{703b})); \text{ and}$$

$$\delta_{707b} = Z_{730b} - Z_{P702b}.$$

In the first of the above equations, $\theta_{P702b}$ and $\theta_{730b}$ may be expressed in degrees and "360" may represent a full rotation about the face of drill bit 701. Therefore, in instances where $\theta_{P702b}$ and $\theta_{730b}$ are expressed in radians, the numbers "360" in the first of the above equations may be changed to "$2\pi$." Further, in the above equation, the resultant angle of "$\theta_{P702b} - \theta_{730b}$" ($\Delta_\theta$) may be defined as always being positive. Therefore, if resultant angle $\Delta_\theta$ is negative, then $\Delta_\theta$ may be made positive by adding 360 degrees (or $2\pi$ radians) to $\Delta_\theta$. Similar equations may be used to determine the depth of cut of cutting elements 728a, 728c, and 729f as controlled by control point $P_{702b}$ at cutlet points 730a, 730c and 730f, respectively ($\Delta_{730a}$, $\Delta_{730c}$ and $\Delta_{730f}$, respectively).

The CDOC provided by point $P_{702b}$ ($\Delta_{P702b}$) may be the maximum of $\Delta_{730a}$, $\Delta_{730b}$, $\Delta_{730c}$ and $\Delta_{730f}$ and may be expressed by the following equation:

$$\Delta_{P702b} = \max[\Delta_{730a}, \Delta_{730b}, \Delta_{730c}, \Delta_{730f}].$$

The CDOC provided by points $P_{702d}$ and $P_{702f}$ ($\Delta_{P702d}$ and $\Delta_{P702f}$, respectively) at radial coordinate $R_F$ may be similarly determined. The overall CDOC of drill bit 701 at radial coordinate $R_F$ ($\Delta_{RF}$) may be based on the minimum of $\Delta_{P702b}$, $\Delta_{P702d}$ and $\Delta_{P702f}$ and may be expressed by the following equation:

$$\Delta_{RF} = \min[\Delta_{P702b}, \Delta_{P702d}, \Delta_{P702}].$$

Accordingly, the overall CDOC of drill bit 701 at radial coordinate $R_F$ ($\Delta_{RF}$) may be determined based on the points where DOCCs 702 and cutting elements 728/729 intersect $R_F$. Although not expressly shown here, it is understood that the overall CDOC of drill bit 701 at radial coordinate $R_F$ ($\Delta_{RF}$) may also be affected by control points $P_{726i}$ (not expressly shown in FIGS. 7A and 7B) that may be associated with blades 726 configured to control the depth of cut of drill bit 701 at radial coordinate $R_F$. In such instances, a CDOC provided by each control point $P_{726i}$ ($\Delta_{P726i}$) may be determined. Each CDOC $\Delta_{P726i}$ for each control point $P_{726i}$ may be included with CDOCs $\Delta_{P702i}$ in determining the minimum CDOC at $R_F$ to calculate the overall CDOC $\Delta_{RF}$ at radial location $R_F$.

To determine a CDCCC of drill bit 701, the overall CDOC at a series of radial locations $R_f$ ($\Delta_{Rf}$) anywhere from the center of drill bit 701 to the edge of drill bit 701 may be determined to generate a curve that represents the CDOC as a function of the radius of drill bit 701. In the illustrated embodiment, DOCCs 702b, 702d, and 702f may be configured to CDOC of drill bit 701 for a radial swath 708 defined as being located between a first radial coordinate $R_A$ and a second radial coordinate $R_B$. Accordingly, the overall CDOC may be determined for a series of radial coordinates $R_f$ that are within radial swath 708 and located between $R_A$ and $R_B$, as disclosed above. Once the overall CDOCs for a sufficient number of radial coordinates $R_f$ are determined, the overall CDOC may be graphed as a function of the radial coordinates $R_f$.

FIG. 7C illustrates a CDCCC for drill bit 701, in accordance with some embodiments of the present disclosure. FIG. 7C illustrates that the CDOC between radial coordinates $R_A$ and $R_B$ may be substantially uniform, indicating that DOCCs 702b, 702d and 702f may be sufficiently configured to provide a substantially even depth of cut control between $R_A$ and $R_B$.

Modifications, additions or omissions may be made to FIGS. 7A-7C without departing from the scope of the present disclosure. For example, as discussed above, blades 726, DOCCs 702 or any combination thereof may affect the CDOC at one or more radial coordinates and the CDOC may be determined accordingly.

Figure 8:
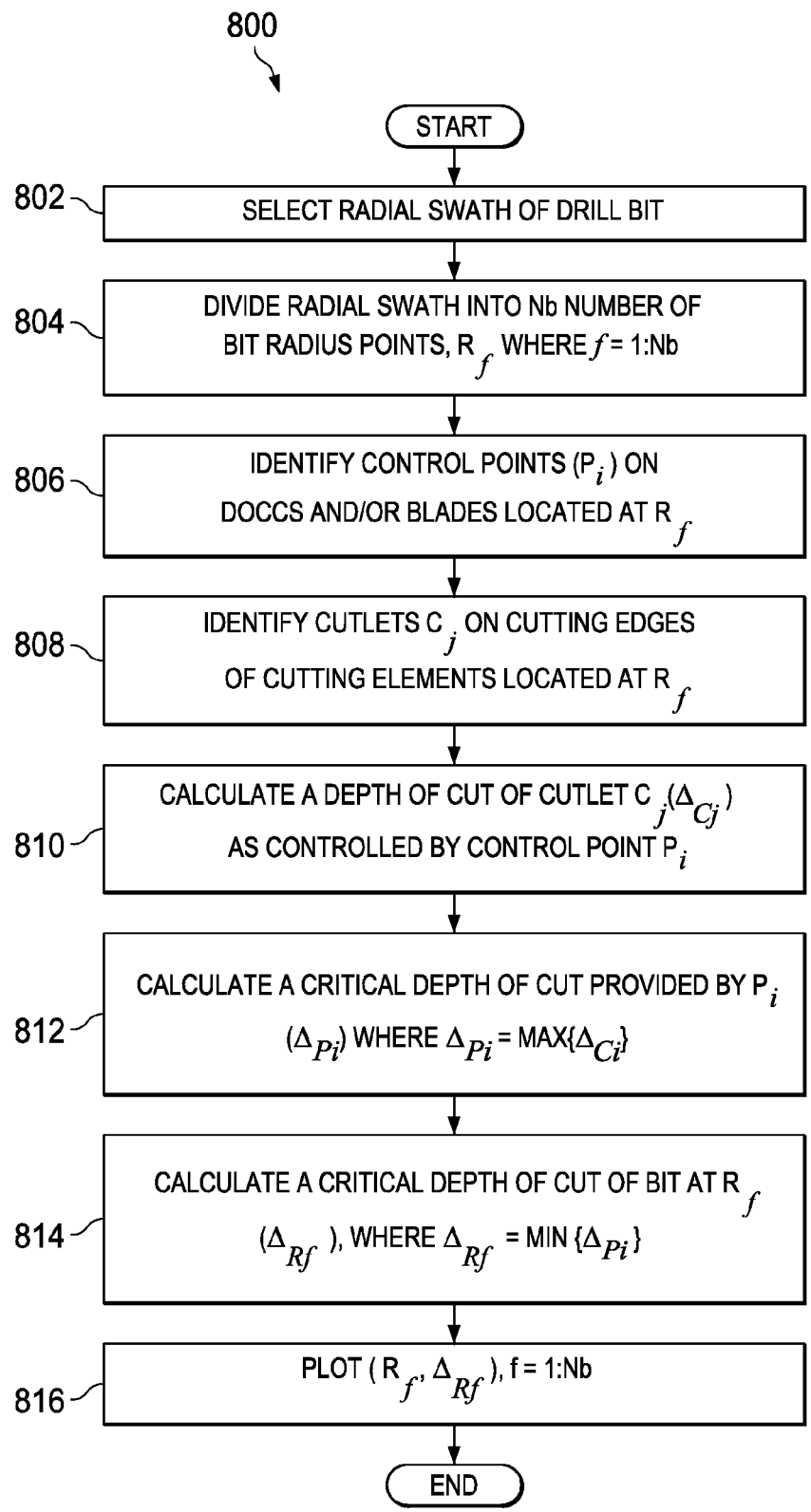
FIG. 8 illustrates an example method of determining and generating a CDCCC, in accordance with some embodiments of the present disclosure.

FIG. 8 illustrates an example method 800 of determining and generating a CDCCC, in accordance with some embodiments of the present disclosure. In the illustrated embodiment, the cutting structures of the bit, including at least the locations and orientations of all cutting elements and DOCCs, may have been previously designed. However in other embodiments, method 800 may include steps for designing the cutting structure of the drill bit. For illustrative purposes, method 800 is described with respect to drill bit 701 of FIGS. 7A-7C; however, method 800 may be used to determine the CDCCC of any suitable drill bit.

The steps of method 800 may be performed by various computer programs, models or any combination thereof, configured to simulate and design drilling systems, apparatuses and devices. The programs and models may include instructions stored on a computer readable medium and operable to perform, when executed, one or more of the steps described below. The computer readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer readable media. Collectively, the computer programs and models used to simulate and design drilling systems may be referred to as a "drilling engineering tool" or "engineering tool."

Method 800 may start, and at step 802, the engineering tool may select a radial swath of drill bit 701 for analyzing the CDOC within the selected radial swath. In some instances the selected radial swath may include the entire face of drill bit 701 and in other instances the selected radial swath may be a portion of the face of drill bit 701. For example, the engineering tool may select radial swath 708 as defined between radial coordinates $R_A$ and $R_B$ and controlled by DOCCs 702b, 702d and 702f, shown in FIGS. 7A-7C.

At step 804, the engineering tool may divide the selected radial swath (e.g., radial swath 708) into a number, Nb, of radial coordinates ($R_f$) such as radial coordinate $R_F$ described in FIGS. 7A and 7B. For example, radial swath 708 may be divided into nine radial coordinates such that Nb for radial swath 708 may be equal to nine. The variable "f" may represent a number from one to Nb for each radial coordinate within the radial swath. For example, "$R_1$" may represent the radial coordinate of the inside edge of a radial swath. Accordingly, for radial swath 708, "$R_1$" may be approximately equal to $R_A$. As a further example, "$R_{Nb}$" may represent the radial coordinate of the outside edge of a radial swath. Therefore, for radial swath 708, "$R_{Nb}$" may be approximately equal to $R_B$.

At step 806, the engineering tool may select a radial coordinate $R_f$ and may identify control points ($P_i$) at may be located at the selected radial coordinate $R_f$ and associated with a DOCC and/or blade. For example, the engineering tool may select radial coordinate $R_F$ and may identify control points $P_{702i}$ and $P_{726i}$ associated with DOCCs 702 and/or blades 726 and located at radial coordinate $R_F$, as described above with respect to FIGS. 7A and 7B.

At step 808, for the radial coordinate $R_f$ selected in step 806, the engineering tool may identify cutlet points ($C_j$) each located at the selected radial coordinate $R_f$ and associated with the cutting edges of cutting elements. For example, the engineering tool may identify cutlet points 730a, 730b, 730c and 730f located at radial coordinate $R_F$ and associated with the cutting edges of cutting elements 728a, 728b, 728c, and 729f, respectively, as described and shown with respect to FIGS. 7A and 7B.

At step 810, the engineering tool may select a control point $P_i$ and may calculate a depth of cut for each cutlet $C_1$ as controlled by the selected control point $P_i$ ($\Delta_{Cj}$), as described above with respect to FIGS. 7A and 7B. For example, the engineering tool may determine the depth of cut of cutlets 730a, 730b, 730c, and 730f as controlled by control point $P_{702b}$ ($\Delta_{730a}$, $\Delta_{730b}$, $\Delta_{730c}$, and $\Delta_{730f}$, respectively) by using the following equations:

$$\Delta_{730a} = \delta_{707a} * 360/(360-(\theta_{P702b}-\theta_{730a}));$$

$$\delta_{707a} = Z_{730a} - Z_{P702b};$$

$$\Delta_{730b} = \delta_{707b} * 360/(360-(\theta_{P702b}-\theta_{730b}));$$

$$\delta_{707b} = Z_{730b} - Z_{P702b};$$

$$\Delta_{730c} = \delta_{707c} * 360/(360-(\theta_{P702b}-\theta_{730c}));$$

$$\delta_{707c} = Z_{730c} - Z_{P702b};$$

$$\Delta_{703f} = \delta_{707f} * 360/(360-(\theta_{P702b}-\theta_{730f})); \text{ and}$$

$$\delta_{707f} = Z_{730f} - Z_{P702b}.$$

At step 812, the engineering tool may calculate the CDOC provided by the selected control point ($\Delta_{Pi}$) by determining the maximum value of the depths of cut of the cutlets $C_1$ as controlled by the selected control point $P_i$ ($\Delta_{Cj}$) and calculated in step 810. This determination may be expressed by the following equation:

$$\Delta_{Pi} = \max\{\Delta_{Cj}\}.$$

For example, control point $P_{702b}$ may be selected in step 810 and the depths of cut for cutlets 730a, 730b, 730c, and 730f as controlled by control point $P_{702b}$ ($\Delta_{730a}$, $\Delta_{730b}$, $\Delta_{730c}$, and $\Delta_{730f}$, respectively) may also be determined in step 810, as shown above. Accordingly, the CDOC provided by control point $P_{702b}$ ($\Delta_{P702b}$) may be calculated at step 812 using the following equation:

$$\Delta_{P702b} = \max[\Delta_{730a}, \Delta_{730b}, \Delta_{730c}, \Delta_{730f}].$$

The engineering tool may repeat steps 810 and 812 for all of the control points $P_i$ identified in step 806 to determine the CDOC provided by all control points $P_i$ located at radial coordinate $R_f$. For example, the engineering tool may perform steps 810 and 812 with respect to control points $P_{702d}$ and $P_{702f}$ to determine the CDOC provided by control points $P_{702d}$ and $P_{702f}$ with respect to cutlets 730a, 730b, 730c, and 730f at radial coordinate $R_F$ shown in FIGS. 7A and 7B (e.g., $\Delta_{P702d}$ and $\Delta_{P702f}$, respectively).

At step 814, the engineering tool may calculate an overall CDOC at the radial coordinate $R_f$ ($\Delta_{Rf}$) selected in step 806. The engineering tool may calculate the overall CDOC at the selected radial coordinate $R_f$ ($\Delta_{Rf}$) by determining a minimum value of the critical depths of cut of control points $P_i$ ($\Delta_{Pi}$) determined in steps 810 and 812. This determination may be expressed by the following equation:

$$\Delta_{Rf} = \min\{\Delta_{Pi}\}.$$

For example, the engineering tool may determine the overall CDOC at radial coordinate $R_F$ of FIGS. 7A and 7B by using the following equation:

$$\Delta_{RF} = \min[\Delta_{P702b}, \Delta_{P702d}, \Delta_{P702f}].$$

The engineering tool may repeat steps 806 through 814 to determine the overall CDOC at all the radial coordinates $R_f$ generated at step 804.

At step 816, the engineering tool may plot the overall CDOC ($\Delta_{Rf}$) for each radial coordinate $R_f$ as a function of each radial coordinate $R_f$. Accordingly, a CDCCC may be calculated and plotted for the radial swath associated with the radial coordinates $R_f$. For example, the engineering tool may plot the overall CDOC for each radial coordinate $R_f$ located within radial swath 708, such that the CDCCC for swath 708 may be determined and plotted, as depicted in FIG. 7C. Following step 816, method 800 may end. Accordingly, method 800 may be used to calculate and plot a CDCCC of a drill bit. The CDCCC may be used to determine whether the drill bit provides a substantially even control of the depth of cut of the drill bit. Therefore, the CDCCC may be used to modify the DOCCs and/or blades of the drill bit configured to control the depth of cut of the drill bit.

Modifications, additions, or omissions may be made to method 800 without departing from the scope of the present disclosure. For example, the order of the steps may be performed in a different manner than that described and some steps may be performed at the same time. Additionally, each individual step may include additional steps without departing from the scope of the present disclosure.

Figure 9B:
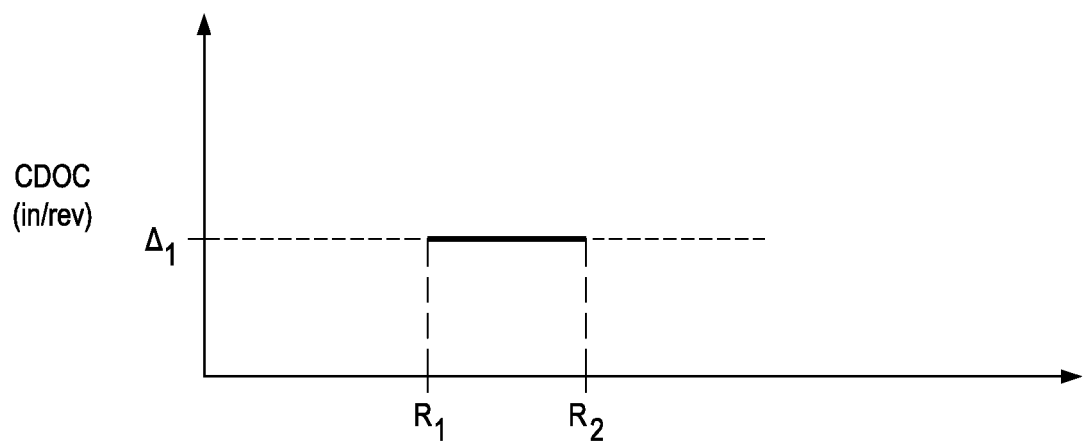
FIG. 9B illustrates a graph of a CDCCC for DOCCs where the CDOC is plotted as a function of the bit radius of the drill bit of FIG. 9A, in accordance with some embodiments of the present disclosure.

FIG. 9A illustrates bit face 902 of an example drill bit 901 with DOCCs 930 for controlling the depth of cut of drill bit 901 to a CDOC within a radial swath, in accordance with some embodiments of the present disclosure. In the illustrated embodiment, drill bit 901 may include blades 926 (e.g., 926a-926f) and/or cutting elements 928 (e.g., 928a-928f) and/or DOCCs 930 (e.g., 930a-930c) that may be disposed on blades 926. DOCCs 930 may each be configured such that drill bit 901 may have a CDOC of $\Delta_1$ within radial swath 910, as shown in FIG. 9B. Radial swath 910 may be defined as being located between a first radial coordinate $R_1$ and a second radial coordinate $R_2$ where $R_2$ may be greater than $R_1$. In the illustrated embodiment, the inner and outer edges of DOCCs 930 may be associated with radial coordinates $R_1$ and $R_2$ respectively. At least two of DOCCs 930 may be track set such that they have the same radial correspondence with respect to bit rotational axis 104 and overlap in a radial swath as drill bit 901 rotates. For example, a particular DOCC, such as DOCC 930a, may be located at the same radial position as another DOCC, e.g., DOCC 930c. As such, DOCC 930a may be track set with respect to DOCC 930c.

Although FIG. 9A depicts six-bladed drill bit 901 with blades 926a-926f, drill bit 901 may include more or fewer blades 926. Additionally, in some designs for drill bit 901, cutting elements 928 may not be configured to overlap the rotational path of other cutting elements 928. Thus, cutting elements 928 may be single set such that each of cutting elements 928 may each have a unique radial position with respect to bit rotational axis 104. However, in some embodiments, some or all of cutting elements 928 may be track set with some of other cutting elements 928. Further, as illustrated, there may be several single set cutting elements 928 located between radius $R_1$ and radius $R_2$ and DOCCs 930a-930c may not be track set with any cutting elements 928.

FIG. 9B illustrates a graphs of a CDCCC for DOCCs 930a-930c where the CDOC is plotted as a function of the bit radius of drill bit 901 of FIG. 9A, in accordance with some embodiments of the present disclosure. The CDCCC indicate that the CDOC of radial swath 910 between radial coordinates $R_1$ and $R_2$ may be substantially even and constant. Therefore, FIG. 9B indicates that DOCCs 930 may be configured to provide a substantially constant depth of cut control for drill bit 901 at radial swath 910. Moreover, based on the configuration of DOCCs 930a-930c (e.g., track set and/or approximately equidistant radial positions), friction forces created at DOCCs 930a-930c may be balanced.

Additionally, DOCCs 930 may be disposed on blades 926 (e.g., track set and/or approximately equidistant radial positions) such that the lateral forces created by DOCCs 930 may be substantially balanced as drill bit 901 drills at or over a CDOC of $\Delta_1$. In the illustrated embodiment, DOCC 930a may be disposed on a blade 926a, DOCC 930b may be disposed on a blade 926b and DOCC 930c may be disposed on a blade 926c. DOCCs 930 may be placed on the respective blades 926 such that DOCCs 930 are track set and spaced approximately 120 degrees apart to more evenly balance the lateral forces created by DOCCs 930 of drill bit 901. Therefore, DOCCs 930 may be configured to provide a substantially constant depth of cut control for drill bit 901 at radial swath 910 and that may improve the force balance conditions of drill bit 901. The actual depth of cut of drill bit 901 may be determined based on drill bit 901 RPM and ROP, as discussed in detail with reference to FIGS. 5A-5C.

According to FIGS. 9A and 9B, DOCCs 930a-930c may be in contact with the formation approximately simultaneously when actual depth of cut of drill bit 901 is approximately equal to or greater than $\Delta_1$. A groove on bottom of a wellbore, e.g., wellbore 114a, may be created by DOCCs 930a-930c. This groove may be deeper than the grooves generated by cutting elements 928. Based on this groove, lateral resistant forces may be generated on DOCCs 930a-930c, which may further increase bit stability.

Furthermore, frictional torque generated by track set DOCCs 930a-930c may be reduced by locating DOCCs 930a-930c closer to bit rotational axis 104. For example, DOCCs 930a-930c may be located in the cone zone 212 of bit face profile 200 shown in FIG. 2. Minimizing frictional torque generated by DOCCs may be desired in directional drilling, especially in horizontal drilling where torque on bit (TOB), which is the torque used to rotate drill bit 901, that is provided by BHA 120 or a down hole motor may be limited.

Modifications, additions or omissions may be made to FIGS. 9A and 9B without departing from the scope of the present disclosure. For example, although DOCCs 930 are depicted as being substantially rounded, DOCCs 930 may be configured to have any suitable shape depending on the design constraints and considerations of DOCCs 930. Additionally, although each DOCC 930 is configured to control the depth of cut of drill bit 901 at radial swath 910, each DOCC 930 may be configured to control the depth of cut of drill bit 901 at different radial swaths, as described below with respect to DOCCs 1030 in FIGS. 10A-10C.

Figure 10B:
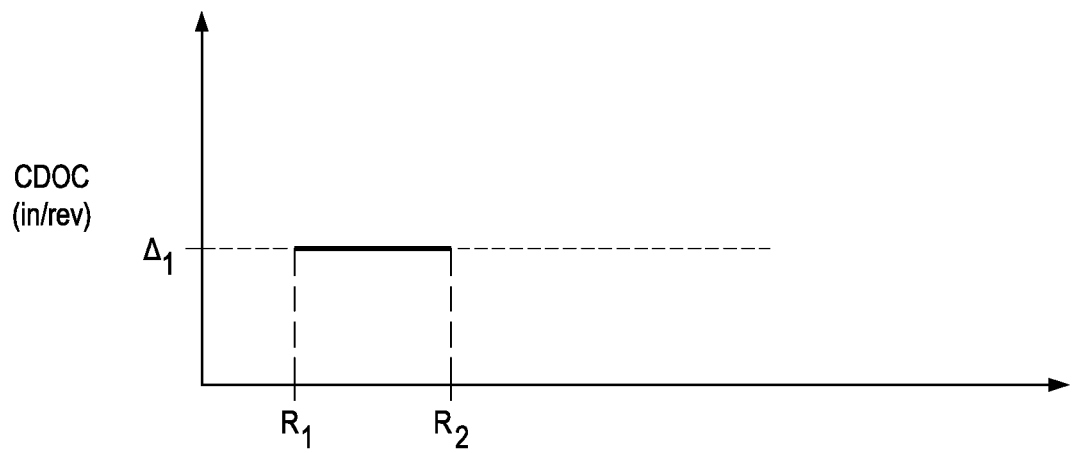
FIGS. 10B and 10C illustrate graphs of CDCCCs for DOCCs within particular radial swaths where the CDOC is plotted as a function of the bit radius of the drill bit of FIG. 10A, in accordance with some embodiments of the present disclosure.
Figure 10C:
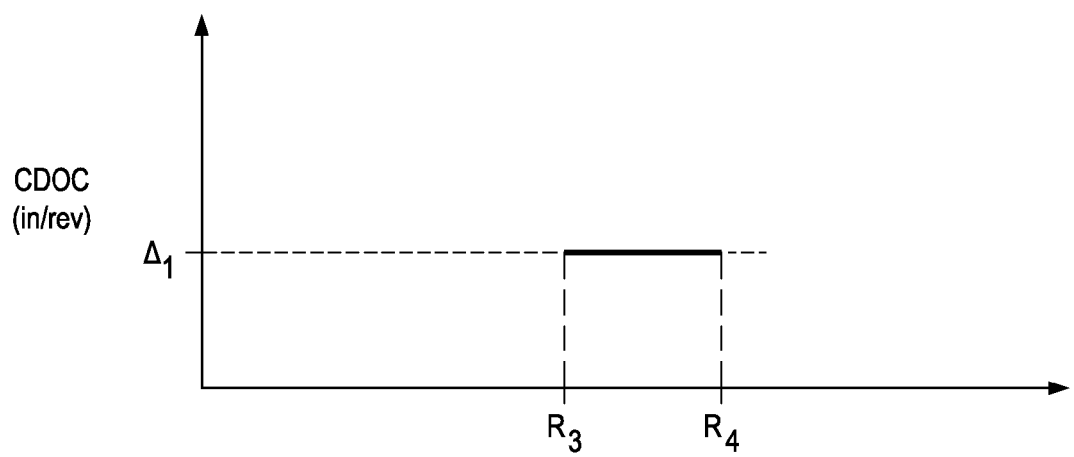

FIG. 10A illustrates a bit face of an example drill bit 1001 with DOCCs 1030 for controlling the depth of cut of drill bit 1001 to a CDOC in multiple radial swaths 1010 and 1012, in accordance with some embodiments of the present disclosure. In the illustrated embodiment, drill bit 1001 may include blades 1026 (e.g., 1026a-1026f) and/or cutting elements 1028 (e.g., 1028a-1028f) and/or DOCCs 1030 (e.g., 1030a-1030i) that may be disposed on blades 1026. Particular DOCCs 1030 (e.g., 1030a-1030c) may each be configured such that drill bit 1001 may have a CDOC of $\Delta_1$ within radial swath 1010, as shown in FIG. 10B. Radial swath 1010 may be defined as being located between a first radial coordinate $R_1$ and a second radial coordinate $R_2$ where $R_2$ may be greater than $R_1$. In the illustrated embodiment, the inner and outer edges of DOCCs 1030a-1030c may be associated with radial coordinates $R_1$ and $R_2$ respectively. Further, particular DOCCs 1030 (e.g., 1030d-1030i) may each be configured such that drill bit 1001 may have a CDOC of $\Delta_1$ within radial swath 1012, as shown in FIG. 10C. Radial swath 1012 may be defined as being located between a third radial coordinate $R_3$ and a fourth radial coordinate $R_4$ where $R_4$ may be greater than $R_3$. Further, in some embodiments, radial swaths 1010 and 1012 may be located adjacent to each other and/or radial swaths 1010 and 1012 may partially overlap or approximately completely overlap. DOCCs 1030d-1030i may be configured such that drill bit 1001 may have a CDOC of $\Delta_1$ within radial swath 1012. In the illustrated embodiment, the inner and outer edges of DOCCs 1030d-1030i may be associated with radial coordinates $R_3$ and $R_4$ respectively.

At least two of DOCCs 1030 may be track set such that they have the same radial correspondence with respect to bit rotational axis 104 and overlap in a radial swath as drill bit 1001 rotates. For example, a particular DOCC, such as DOCC 1030a, may be located at the same radial position as another DOCC, e.g., DOCC 1030c. As such, DOCC 1030a may be track set with respect to DOCC 1030c. As another example, DOCC 1030d may be located at the same radial position as DOCC 1030i such that DOCC 1030d and DOCC 1030i are track set. In the illustrated embodiment, DOCCs 1030d-1030i may be track set with each other. Additionally, in the illustrated embodiment DOCCs 1030a-1030c may be track set with each other.

Although FIG. 10A depicts six-bladed drill bit 1001 with blades 1026a-1026f, drill bit 1001 may include more or fewer blades 1026. Additionally, in some designs for drill bit 1001, cutting elements 1028 may not be configured to overlap the rotational path of other cutting elements 1028. Thus, cutting elements 1028 may be single set such that each of cutting elements 1028 may each have a unique radial position with respect to bit rotational axis 104. However, in some embodiments, some or all of cutting elements 928 may be track set with some of other cutting elements 11028. Further, as illustrated, there may be several single set cutting elements 1028 located between radius $R_1$ and radius $R_2$ and/or between radius $R_3$ and radius $R_4$ and DOCCs 1030a-1030i may not be track set with any cutting elements 1028.

FIGS. 10B and 10C illustrate graphs of CDCCCs for DOCCs 1030 within particular radial swaths 1010 and 1012 where the CDOC is plotted as a function of the bit radius of drill bit 1001 of FIG. 10A, in accordance with some embodiments of the present disclosure. In FIG. 10B, the CDCCC indicates that the CDOC of radial swath 1010 between radial coordinates $R_1$ and $R_2$ may be substantially even and constant. Therefore, DOCCs 1030a-1030c may be configured to provide a substantially constant depth of cut control for drill bit 1001 within radial swath 1010. Moreover, based on the configuration of DOCCs 1030a-1030c (e.g., track set and/or approximately equidistant radial positions), friction forces created at DOCCs 1030a-1030c may be balanced. In FIG. 10C, the CDCCC indicates that the CDOC of radial swath 1012 between radial coordinates $R_3$ and $R_4$ may also be substantially even and constant. Therefore, DOCCs 1030d-1030i may be configured to provide a substantially constant depth of cut control for drill bit 1001 at radial swath 1012. Thus, FIGS. 10B and 10C indicate that DOCCs 1030a-1030i may provide a combined depth of cut control for radial swaths 1010 and 1012. Moreover, based on the configuration of DOCCs 1030d-1030i (e.g., track set and/or approximately equidistant radial positions), friction forces created at DOCCs 1030d-1030i may be balanced.

Additionally, similar to DOCCs 930 of FIG. 9A, DOCCs 1030 may be disposed on blades 1026 (e.g., track set and/or approximately equidistant radial positions) such that the lateral forces created by DOCCs 1030 may be substantially balanced as drill bit 1001 drills at or over a CDOC of $\Delta_1$. In the illustrated embodiment, DOCC 1030a and 1030g may be disposed on a blade 1026a, DOCC 1030b and 1030h may be disposed on a blade 1026b and DOCC 1030c and 1030i may be disposed on a blade 1026c. Additionally, DOCC 1030d may be disposed on a blade 1026d, DOCC 1030e may be disposed on a blade 1026e and DOCC 1030f may be disposed on a blade 1026f. DOCCs 1030 may be placed on the respective blades 1026 such that DOCCs 1030 are track set and spaced approximately 120 degrees apart to more evenly balance the lateral forces created by DOCCs 1030 of drill bit 1001. Therefore, DOCCs 1030 may be configured to provide a substantially constant depth of cut control for drill bit 1001 at both radial swaths 1010 and 1012 and that may improve the force balance conditions of drill bit 1001. The actual depth of cut of drill bit 1001 may be determined based on drill bit 1001 RPM and ROP, as discussed in detail with reference to FIGS. 5A-5C.

According to FIGS. 10A-10C, DOCCs 1030a-1030i may be in contact with the formation simultaneously when actual depth of cut of drill bit 1001 is approximately equal to or greater than $\Delta_1$. A groove on bottom of a wellbore, e.g., wellbore 114a, may be created by DOCCs 1030a-1030i. This groove may be deeper than the grooves generated by cutting elements 1028. Based on this groove, lateral resistant forces may be generated on DOCCs 1030a-1030i, which may further increase bit stability.

Furthermore, frictional torque generated by track set DOCCs 1030a-1030i may be reduced by locating particular DOCCs 1030 (e.g., 1030a-1030c) closer to bit rotational axis 104. For example, DOCCs 1030a-1030c, configured in radial swath 1010, may be located in the cone zone 212 of bit face profile 200 shown in FIG. 2.

Modifications, additions or omissions may be made to FIGS. 10A-10C without departing from the scope of the present disclosure. For example, although DOCCs 1030 are depicted as being substantially rounded, DOCCs 1030 may be configured to have any suitable shape depending on the design constraints and considerations of DOCCs 1030. Additionally, although each DOCC 1030 is configured to control the depth of cut of drill bit 1001 at radial swaths 1010 and 1012, each DOCC 1030 may be configured to control the depth of cut of drill bit 1001 at different radial swaths, and/or at radial swaths that overlap partially or overlap approximately completely. Further, drill bit 1001 may be configured to provide a different CDOC for the same radial swath (e.g., radial swath 1012) of drill bit 1001, as described below with respect to DOCCs 1130 in FIGS. 11A-11C.

Figure 11B:
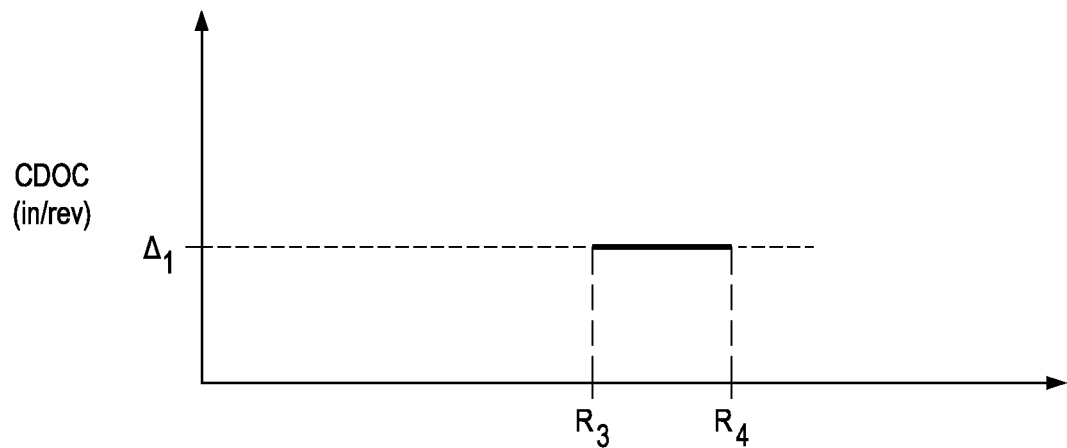
FIGS. 11B and 11C illustrate graphs of CDCCCs for DOCCs configured to control the depth of cut at different CDOCs where the CDOC is plotted as a function of the bit radius of the drill bit of FIG. 11A, in accordance with some embodiments of the present disclosure.
Figure 11C:
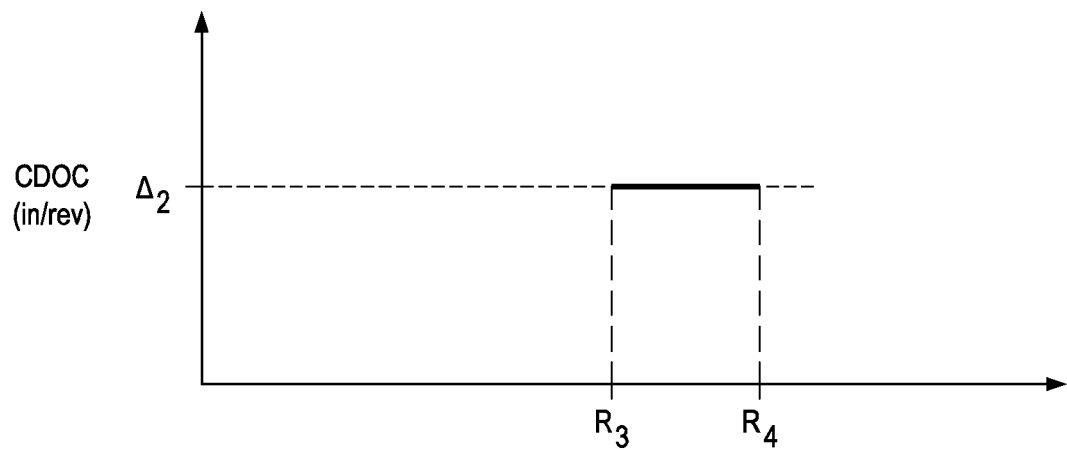

FIG. 11A illustrates bit face 1140 of an example drill bit 1101 with DOCCs 1130 for controlling the depth of cut of drill bit 1101 at multiple CDOCs of $\Delta_1$ and $\Delta_2$ within radial swath 1112, in accordance with some embodiments of the present disclosure. In the illustrated embodiment, drill bit 1101 may include blades 1126 (e.g., 1126a-1126f) and/or cutting elements 1128 (e.g., 1128a-1128f) and/or DOCCs 1130 (e.g., 1130a-1130f) that may be disposed on blades 1126. DOCCs 1130a-1130c may be configured such that drill bit 1101 may have a first CDOC of $\Delta_1$ within radial swath 1112 as shown in FIG. 11B. DOCCs 1130d-1130f may be configured such that drill bit 1101 may have a second CDOC of $\Delta_2$ within radial swath 1112 as shown in FIG. 11C. Radial swath 1112 may be defined as being located between a third radial coordinate $R_3$ and a fourth radial coordinate $R_4$ where $R_4$ may be greater than $R_3$. In the illustrated embodiment, the inner and outer edges of DOCCs 1130 may be associated with radial coordinates $R_3$ and $R_4$ respectively. Accordingly, DOCCs 1130 may be configured such that drill bit 1101 may have a first CDOC $\Delta_1$ for radial swath 412 and a second CDOC $\Delta_2$ for radial swath 412, as illustrated in FIGS. 11B and 11C.

At least two of DOCCs 1130 may be track set such that they have the same radial correspondence with respect to bit rotational axis 104 and overlap in a radial swath as drill bit 1101 rotates. For example, a particular DOCC, such as DOCC 1130a, may be located at the same radial position as another DOCC, e.g., DOCC 1130c. As such, DOCC 1130a may be track set with respect to DOCC 1130c. In the illustrated embodiment, DOCCs 1130a-1130f may be track set with each other.

Although FIG. 11A depicts six-bladed drill bit 1101 with blades 1126a-1126f, drill bit 1101 may include more or fewer blades 1126. Additionally, in some designs for drill bit 1101, cutting elements 1128 may not be configured to overlap the rotational path of other cutting elements 1128. Thus, cutting elements 1128 may be single set such that each of cutting elements 1128 may each have a unique radial position with respect to bit rotational axis 104. However, in some embodiments, some or all of cutting elements 1128 may be track set with some of other cutting elements 1128. Further, as illustrated, there may be several single set cutting elements 1128 located between radius $R_3$ and radius $R_4$ and DOCCs 1130a-1130c may not be track set with any cutting elements 1128.

FIGS. 11B and 11C illustrate graphs of CDCCCs for DOCCs configured to control the depth of cut at different CDOCs of $\Delta_1$ and $\Delta_2$ where the CDOC is plotted as a function of the bit radius of drill bit 1101 of FIG. 11A, in accordance with some embodiments of the present disclosure. The CDCCC indicate that the CDOC of radial swath 1112 between radial coordinates $R_3$ and $R_4$ may be substantially even and constant. Therefore, FIG. 11B indicates that DOCCs 1130a-1130c may be configured to provide a substantially constant depth of cut control for drill bit 1101 at radial swath 1112 and at CDOC of $\Delta_1$. Moreover, based on the configuration of DOCCs 1130a-1130c (e.g., track set and/or approximately equidistant radial positions), friction forces created at DOCCs 1130a-1130c may be balanced. FIG. 11C indicates that DOCCs 1130d-1130f may be configured to provide a substantially constant depth of cut control for drill bit 1101 at radial swath 1112 and at CDOC of $\Delta_2$. Moreover, based on the configuration of DOCCs 1130d-1130f (e.g., track set and/or approximately equidistant radial positions), friction forces created at DOCCs 1130d-1130f may be balanced.

Additionally, DOCCs 1130 may be disposed on blades 1126 (e.g., track set and/or approximately equidistant radial positions) such that the lateral forces created by DOCCs 1130 may be substantially balanced as drill bit 1101 drills at or over a CDOC of $\Delta_1$. In the illustrated embodiment, DOCC 1130a may be disposed on a blade 1126a, DOCC 1130b may be disposed on a blade 1126b and DOCC 1130c may be disposed on a blade 1126c. Additionally, DOCC 1130d may be disposed on a blade 1126d, DOCC 1130e may be disposed on a blade 1126e and DOCC 1130f may be disposed on a blade 1126f. DOCCs 1130 may be placed on the respective blades 1126 such that DOCCs 1130a-1130f are track set and the sub-sets of DOCCs 1130a-1130c and 1130d-1130f may be each spaced approximately 120 degrees apart to more evenly balance the lateral forces created by DOCCs 1130 of drill bit 1101. Therefore, DOCCs 1130 may be configured to provide a substantially constant depth of cut control at both CDOC $\Delta_2$ and $\Delta_2$ for drill bit 1101 at radial swath 1112 and that may improve the force balance conditions of drill bit 1101.

According to FIGS. 11A-11C, DOCCs 1130a-1130c may be in contact with the formation simultaneously when actual depth of cut of drill bit 1101 is approximately equal to or greater than $\Delta_1$. DOCCs 1130d-1130f may be in contact with the formation simultaneously when actual depth of cut of drill bit 1101 is approximately equal to or greater than $\Delta_2$. A groove on bottom of a wellbore, e.g., wellbore 114a, may be created by DOCCs 1130a-1130f. This groove may be deeper than the grooves generated by cutting elements 1128. Based on this groove, lateral resistant forces may be generated on DOCCs 1130a-1130f, which may further increase bit stability.

Modifications, additions or omissions may be made to FIGS. 11A-11C without departing from the scope of the present disclosure. For example, although DOCCs 1130 are depicted as being substantially rounded, DOCCs 1130 may be configured to have any suitable shape depending on the design constraints and considerations of DOCCs 1130. Additionally, although each DOCC 1130 is configured to control the depth of cut of drill bit 1101 at radial swath 1112, each DOCC 1130 may be configured to control the depth of cut of drill bit 1101 at different radial swaths and/or at different CDOCs, as described below with respect to DOCCs 1230 in FIGS. 12A-12C.

Figure 12B:
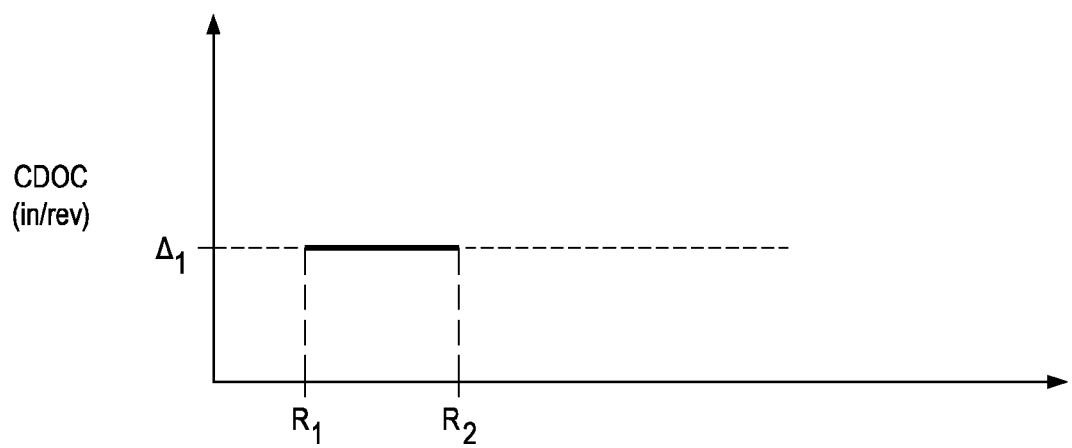
FIGS. 12B and 12C illustrate graphs of CDCCC for DOCCs configured to control the depth of cut at different CDOCs and in multiple radial swaths where the CDOC is plotted as a function of the bit radius of the drill bit of FIG. 12A, in accordance with some embodiments of the present disclosure.
Figure 12C:
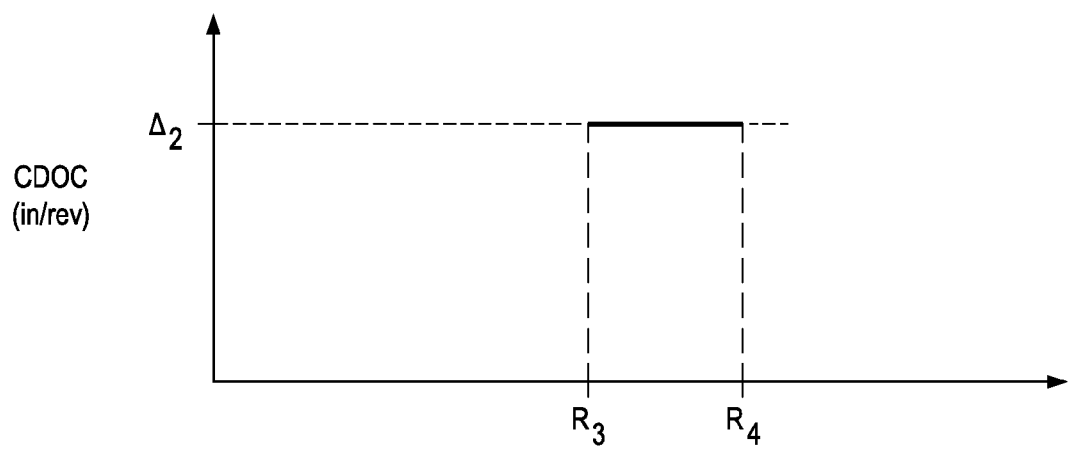

FIG. 12A illustrates bit face 1240 of an example drill bit 1201 with DOCCs 1230 for controlling the depth of cut of drill bit 1201 at multiple CDOCs of $\Delta_1$ and $\Delta_2$ and in multiple radial swaths 1210 and 1212, in accordance with some embodiments of the present disclosure. In the illustrated embodiment, drill bit 1201 may include blades 1226 (e.g., 1226a-1226f) and/or cutting elements 1228 (e.g., 1228a-1228f) and/or DOCCs 1230 (e.g., 1230a-1230i) that may be disposed on blades 1226. Particular DOCCs 1230 (e.g., 1230a-1230c) may each be configured such that drill bit 1201 may have a CDOC of $\Delta_1$ within radial swath 1210, as shown in FIG. 12B. Radial swath 1210 may be defined as being located between a first radial coordinate $R_1$ and a second radial coordinate $R_2$ where $R_2$ may be greater than $R_1$. In the illustrated embodiment, the inner and outer edges of DOCCs 1230a-1230c may be associated with radial coordinates $R_1$ and $R_2$ respectively. Further, particular DOCCs 1230 (e.g., 1230d-1230i) may each be configured such that drill bit 1201 may have a CDOC of $\Delta_2$ within radial swath 1212, as shown in FIG. 12C. Radial swath 1212 may be defined as being located between a third radial coordinate $R_3$ and a fourth radial coordinate $R_4$ where $R_4$ may be greater than $R_3$. Further, in some embodiments, radial swaths 1210 and 1212 may be located adjacent to each other and/or radial swaths 1210 and 1212 may partially overlap or approximately completely overlap. DOCCs 1230d-1230i may be configured such that drill bit 1201 may have a CDOC of $\Delta_1$ within radial swath 1212. In the illustrated embodiment, the inner and outer edges of DOCCs 1230d-1230i may be associated with radial coordinates $R_3$ and $R_4$ respectively.

At least two of DOCCs 1230 may be track set such that they have the same radial correspondence with respect to bit rotational axis 104 and overlap in a radial swath as drill bit 1201 rotates. For example, a particular DOCC, such as DOCC 1230a, may be located at the same radial position as another DOCC, e.g., DOCC 1230c. As such, DOCC 1230a may be track set with respect to DOCC 1230c. As another example, DOCC 1230d may be located at the same radial position as DOCC 1230i such that DOCC 1230d and DOCC 1230i are track set. In the illustrated embodiment, DOCCs 1230d-1230i may be track set with each other. Additionally, in the illustrated embodiment DOCCs 1230a-1230c may be track set with each other.

Although FIG. 12A depicts six-bladed drill bit 1201 with blades 1226a-1226f, drill bit 1201 may include more or fewer blades 1226. Additionally, in some designs for drill bit 1201, cutting elements 1228 may not be configured to overlap the rotational path of other cutting elements 1228.

Thus, cutting elements 1228 may be single set such that each of cutting elements 1228 may each have a unique radial position with respect to bit rotational axis 104. However, in some embodiments, some or all of cutting elements 1228 may be track set with some of other cutting elements 1228. Further, as illustrated, there may be several single set cutting elements 1228 located between radius $R_1$ and radius $R_2$ and/or between radius $R_3$ and radius $R_4$ and DOCCs 1230a-1230i may not be track set with any cutting elements 1228.

FIGS. 12B and 12C illustrate graphs of CDCCC for DOCCs 1230 configured to control the depth of cut at different CDOCs of $\Delta_1$ and $\Delta_2$ and in multiple radial swaths 1210 and 1212 where the CDOC is plotted as a function of the bit radius of drill bit 1201 of FIG. 12A, in accordance with some embodiments of the present disclosure. In FIG. 12B, the CDCCC indicates that the CDOC of radial swath 1210 between radial coordinates $R_1$ and $R_2$ may be substantially even and constant. Therefore, DOCCs 1230a-1230c may be configured to provide a substantially constant depth of cut control for drill bit 1201 at radial swath 1210 at a CDOC of $\Delta_1$. Moreover, based on the configuration of DOCCs 1230a-1230c (e.g., track set and/or approximately equidistant radial positions), friction forces created at DOCCs 1230a-1230c may be balanced. In FIG. 12C, the CDCCC indicates that the CDOC of radial swath 1212 between radial coordinates $R_3$ and $R_4$ may also be substantially even and constant at a CDOC of $\Delta_2$. Therefore, DOCCs 1230d-1230i may be configured to provide a substantially constant depth of cut control for drill bit 1201 at radial swath 1212. Moreover, based on the configuration of DOCCs 1230d-1230i (e.g., track set and/or approximately equidistant radial positions), friction forces created at DOCCs 1230d-1230i may be balanced.

Additionally, DOCCs 1230 may be disposed on blades 1226 (e.g., track set and/or approximately equidistant radial positions) such that the lateral forces created by DOCCs 1230 may be substantially balanced as drill bit 1201 drills at or over a CDOC of $\Delta_1$. In the illustrated embodiment, DOCC 1230a and 1230g may be disposed on a blade 1226a, DOCC 1230b and 1230h may be disposed on a blade 1226b and DOCC 1230c and 1230i may be disposed on a blade 1226c. Additionally, DOCC 1230d may be disposed on a blade 1226d, DOCC 1230e may be disposed on a blade 1226e and DOCC 1230f may be disposed on a blade 1226f. DOCCs 1230 may be placed on the respective blades 1226 such that DOCCs 1230 are track set and spaced approximately 120 degrees apart to more evenly balance the lateral forces created by DOCCs 1230 of drill bit 1201. Therefore, DOCCs 1230 may be configured to provide a substantially constant depth of cut control for drill bit 1201 at both radial swaths 1210 and 1212 and that may improve the force balance conditions of drill bit 1201. The actual depth of cut of drill bit 1201 may be determined by drill bit 1201 RPM and ROP, as discussed in detail with reference to FIGS. 5A-5C.

According to FIGS. 12A-12C, DOCCs 1230a-1230c may be in contact with the formation simultaneously when actual depth of cut of drill bit 1201 is approximately equal to or greater than $\Delta_1$. DOCCs 1230d-1230i may be in contact with the formation simultaneously when actual depth of cut of drill bit 1201 is approximately equal to or greater than $\Delta_2$. A groove on bottom of a wellbore, e.g., wellbore 114a, may be created by DOCCs 1230a-1230i. This groove may be deeper than the grooves generated by cutting elements 1228. Based on this groove, lateral resistant forces may be generated on DOCCs 1230a-1230i, which may further increase bit stability.

Furthermore, frictional torque generated by track set DOCCs 1230a-1230i may be reduced by locating particular DOCCs 1230 (e.g., 1230a-1230c) closer to bit rotational axis 104. For example, DOCCs 1230a-1230c, configured in radial swath 1210, may be located in the cone zone 212 of bit face profile 200 shown in FIG. 2.

Modifications, additions or omissions may be made to FIGS. 12A-12C without departing from the scope of the present disclosure. For example, although DOCCs 1230 are depicted as being substantially rounded, DOCCs 1230 may be configured to have any suitable shape depending on the design constraints and considerations of DOCCs 1230. Additionally, although each DOCC 1230 is configured to control the depth of cut of drill bit 1201 at radial swaths 1210 and 1212, each DOCC 1230 may be configured to control the depth of cut of drill bit 1201 at different radial swaths, and/or at radial swaths that overlap partially or overlap approximately completely. Further, drill bit 1201 may be configured to provide multiple CDOCs for the same radial swath (e.g., radial swath 1212) of drill bit 1201, as described below with respect to DOCCs 1330 in FIGS. 13A-13D.

Figure 13A:
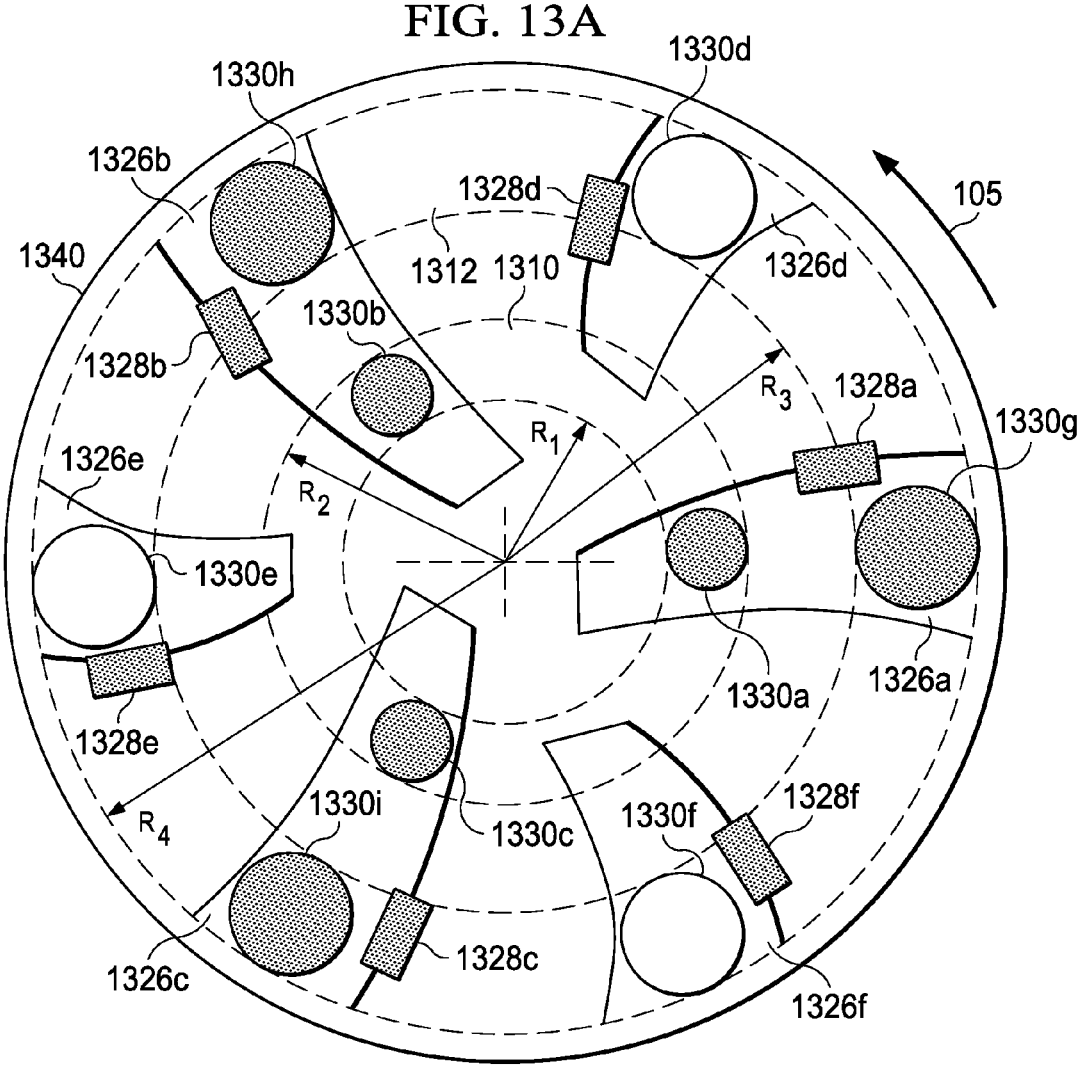
FIG. 13A illustrates a bit face of a further example drill bit with DOCCs for controlling the depth of cut of the drill bit at a first CDOC in multiple radial swaths and at a second CDOC in a radial swath, in accordance with some embodiments of the present disclosure.
Figure 13B:
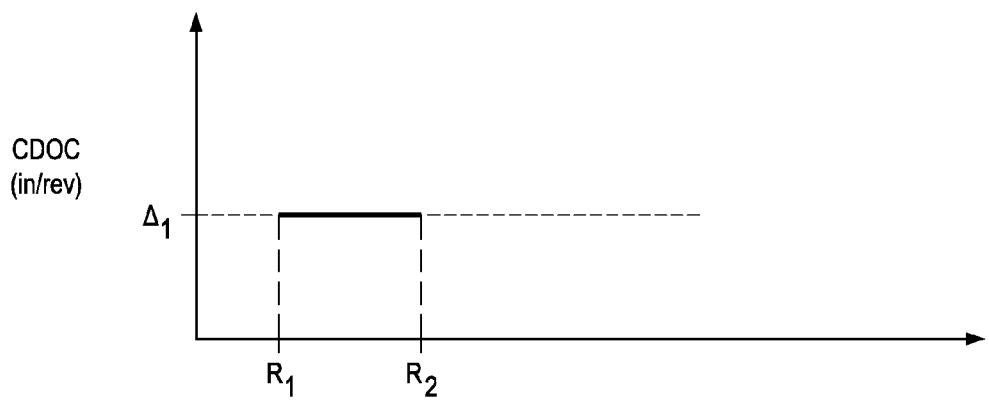
FIG. 13B illustrates a graph of a CDCCC for DOCCs configured to control the depth of cut to a first CDOC within a first radial swath where the CDOC is plotted as a function of the bit radius of the drill bit of FIG. 13A, in accordance with some embodiments of the present disclosure.
Figure 13C:
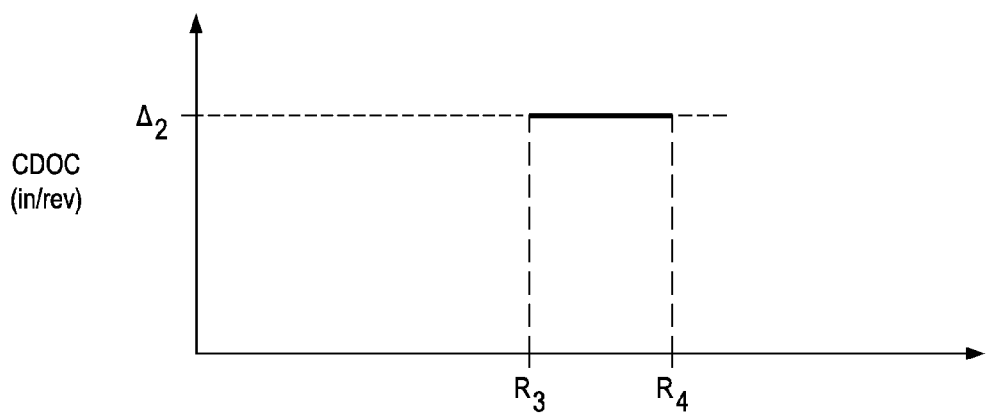
FIG. 13C illustrates a graph of a CDCCC for DOCCs configured to control the depth of cut to a second CDOC within a second radial swath where the CDOC is plotted as a function of the bit radius of the drill bit of FIG. 13A, in accordance with some embodiments of the present disclosure.

FIG. 13A illustrates bit face 1340 of an example drill bit 1301 with DOCCs 1330 for controlling the depth of cut of drill bit 1301 at a first CDOC of $\Delta_1$ in multiple radial swaths 1310 and 1312 and at a second CDOC of $\Delta_2$ in radial swath 1312, in accordance with some embodiments of the present disclosure. In the illustrated embodiment, drill bit 1301 may include blades 1326 (e.g., 1326a-1326f) and/or cutting elements 1328 (e.g., 1328a-1328f) and/or DOCCs 1330 (e.g., 1330a-1330i) that may be disposed on blades 1326. Particular DOCCs 1330 (e.g., 1330a-1330c) may each be configured such that drill bit 1301 may have a CDOC of $\Delta_1$ within radial swath 1310, as shown in FIG. 13B. Radial swath 1310 may be defined as being located between a first radial coordinate $R_1$ and a second radial coordinate $R_2$ where $R_2$ may be greater than $R_1$. In the illustrated embodiment, the inner and outer edges of DOCCs 1330a-1330c may be associated with radial coordinates $R_1$ and $R_2$ respectively. Further, particular DOCCs 1330 (e.g., 1330g-1330i) may each be configured such that drill bit 1301 may have a CDOC of $\Delta_2$ within radial swath 1312, as shown in FIG. 13C. Radial swath 1312 may be defined as being located between a third radial coordinate $R_3$ and a fourth radial coordinate $R_4$ where $R_4$ may be greater than $R_3$. Further, in some embodiments, radial swaths 1310 and 1312 may be located adjacent to each other and/or radial swaths 1310 and 1312 may partially overlap or approximately completely overlap. Particular DOCCs 1330d-1330f may be configured such that drill bit 1301 may have a CDOC of $\Delta_1$ within radial swath 1312. In the illustrated embodiment, the inner and outer edges of DOCCs 1330d-1330i may be associated with radial coordinates $R_3$ and $R_4$ respectively.

At least two of DOCCs 1330 may be track set such that they have the same radial correspondence with respect to bit rotational axis 104 and overlap in a radial swath as drill bit 1301 rotates. For example, a particular DOCC, such as DOCC 1330a, may be located at the same radial position as another DOCC, e.g., DOCC 1330c. As such, DOCC 1330a may be track set with respect to DOCC 1330c. As another example, DOCC 1330d may be located at the same radial position as DOCC 1330i such that DOCC 1330d and DOCC 1330i are track set. In the illustrated embodiment, DOCCs 1330d-1330i may be track set with each other. Additionally, in the illustrated embodiment DOCCs 1330a-1330c may be track set with each other.

Although FIG. 13A depicts six-bladed drill bit 1301 with blades 1326a-1326f, drill bit 1301 may include more or fewer blades 1326. Additionally, in some designs for drill bit 1301, cutting elements 1328 may not be configured to overlap the rotational path of other cutting elements 1328. Thus, cutting elements 1328 may be single set such that each of cutting elements 1328 may each have a unique radial position with respect to bit rotational axis 104. However, in some embodiments, some or all of cutting elements 1328 may be track set with some of other cutting elements 1328. Further, as illustrated, there may be several single set cutting elements 1328 located between radius $R_1$ and radius $R_2$ and/or between radius $R_3$ and radius $R_4$ and DOCCs 1330a-1330i may not be track set with any cutting elements 1328.

FIG. 13B illustrates a graph of a CDCCC for DOCCs 1330a-1330c configured to control the depth of cut to a first CDOC of $\Delta_1$ within a first radial swath 1310 where the CDOC is plotted as a function of the bit radius of drill bit 1301 of FIG. 13A, in accordance with some embodiments of the present disclosure. In FIG. 13B, the CDCCC indicates that the CDOC of radial swath 1310 between radial coordinates $R_1$ and $R_2$ may be substantially even and constant. Therefore, DOCCs 1330a-1330c may be configured to provide a substantially constant depth of cut control for drill bit 1301 at radial swath 1310 at a CDOC of $\Delta_1$. Moreover, based on the configuration of DOCCs 1330a-1330c (e.g., track set and/or approximately equidistant radial positions), friction forces created at DOCCs 1330a-1330c may be balanced.

FIG. 13C illustrates a graph of a CDCCC for DOCCs 1330g-1330i configured to control the depth of cut to a second CDOC of $\Delta_2$ within a second radial swath 1312 where the CDOC is plotted as a function of the bit radius of drill bit 1301 of FIG. 13A, in accordance with some embodiments of the present disclosure. In FIG. 13C, the CDCCC indicates that the CDOC of radial swath 1312 between radial coordinates $R_3$ and $R_4$ may also be substantially even and constant at a CDOC of Δ2. Therefore, DOCCs 1330g-1330i may be configured to provide a substantially constant depth of cut control for drill bit 1301 at radial swath 1312 of $\Delta_2$. Moreover, based on the configuration of DOCCs 1330g-1330i (e.g., track set and/or approximately equidistant radial positions), friction forces created at DOCCs 1330g-1330i may be balanced.

Figure 13D:
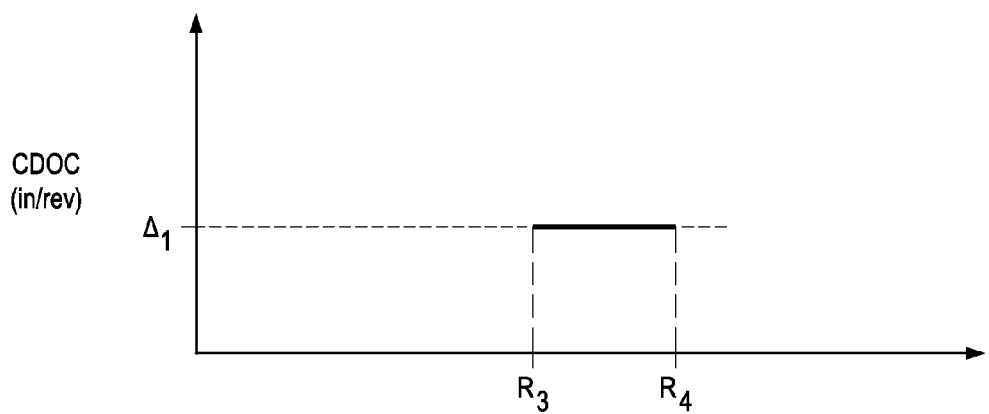
FIG. 13D illustrates a graph of a CDCCC for DOCCs configured to control the depth of cut to a first CDOC within a second radial swath where the CDOC is plotted as a function of the bit radius of the drill bit of FIG. 13A, in accordance with some embodiments of the present disclosure.

FIG. 13C illustrates a graph of a CDCCC for DOCCs 1330d-1330f configured to control the depth of cut to a first CDOC of $\Delta_1$ within a second radial swath 1312 where the CDOC is plotted as a function of the bit radius of drill bit 1301 of FIG. 13A, in accordance with some embodiments of the present disclosure. In FIG. 13D, the CDCCC indicate that the CDOC of radial swath 1312 between radial coordinates $R_3$ and $R_4$ may also be substantially even and constant at a CDOC of $\Delta_1$. Therefore, DOCCs 1330d-1330f may be configured to provide a substantially constant depth of cut control for drill bit 1301 at radial swath 1312 of $\Delta_1$. Moreover, based on the configuration of DOCCs 1330d-1330f (e.g., track set and/or approximately equidistant radial positions), friction forces created at DOCCs 1330d-1330f may be balanced.

Additionally, DOCCs 1330 may be disposed on blades 1326 (e.g., track set and/or approximately equidistant radial positions) such that the lateral forces created by DOCCs 1330 may be substantially balanced as drill bit 1301 drills at or over a CDOC of $\Delta_1$. In the illustrated embodiment, DOCC 1330a and 1330g may be disposed on a blade 1326a, DOCC 1330b and 1330h may be disposed on a blade 1326b and DOCC 1330c and 1330i may be disposed on a blade 1326c. Additionally, DOCC 1330d may be disposed on a blade 1326d, DOCC 1330e may be disposed on a blade 1326e and DOCC 1330f may be disposed on a blade 1326f. DOCCs 1330 may be placed on the respective blades 1326 such that DOCCs 1330 are track set and spaced approximately 120 degrees apart to more evenly balance the lateral forces created by DOCCs 1330 of drill bit 1301. Therefore, DOCCs 1330 may be configured to provide a substantially constant depth of cut control for drill bit 1301 at both radial swaths 1310 and 1312 and that may improve the force balance conditions of drill bit 1301. The actual depth of cut of drill bit 1301 may be determined by drill bit 1301 RPM and ROP, as discussed in detail with reference to FIGS. 5A-5C.

According to FIGS. 13A-13D, DOCCs 1330a-1330f may be in contact with the formation simultaneously when actual depth of cut of drill bit 1301 is approximately equal to or greater than $\Delta_1$. DOCCs 1330g-1330i may be in contact with the formation simultaneously when actual depth of cut of drill bit 1301 is approximately equal to or greater than $\Delta_2$. A groove on bottom of a wellbore, e.g., wellbore 114a, may be created by DOCCs 1330a-1330i. This groove may be deeper than the grooves generated by cutting elements 1328. Based on this groove, lateral resistant forces may be generated on DOCCs 1330a-1330i, which may further increase bit stability.

Furthermore, frictional torque generated by track set DOCCs 1330a-1330i may be reduced by locating particular DOCCs 1330 (e.g., 1330a-1330c) closer to bit rotational axis 104. For example, DOCCs 1330a-1330c, configured in radial swath 1310, may be located in the cone zone 212 of bit face profile 200 shown in FIG. 2.

Modifications, additions or omissions may be made to FIGS. 13A-13C without departing from the scope of the present disclosure. For example, although DOCCs 1330 are depicted as being substantially rounded, DOCCs 1330 may be configured to have any suitable shape depending on the design constraints and considerations of DOCCs 1330. Additionally, although each DOCC 1330 is configured to control the depth of cut of drill bit 1301 at radial swaths 1310 and 1312, each DOCC 1330 may be configured to control the depth of cut of drill bit 1301 at different radial swaths, and/or at radial swaths that overlap partially or overlap approximately completely.

Although the present disclosure and its advantages have been described in detail, it should be understood that various changes, substitutions and alterations can be made herein without departing from the spirit and scope of the disclosure as defined by the following claims.

What is claimed is:

1. A drill bit designed for drilling a wellbore, comprising:
  a bit body with a rotational axis extending therethrough;
  a plurality of blades disposed on exterior portions of the bit body; and
  a first group of track set depth of cut controllers (DOCCs) disposed on exterior portions of a first set of the plurality of blades, the first group of track set DOCCs configured to:
    be placed within a first radial swath of a bit face of the drill bit such that at least two of the track set DOCCs in the first group are located at a first radial position with respect to the rotational axis; and
    provide a first critical depth of cut (CDOC);
  a second group of track set DOCCs disposed on exterior portions of a second set of the plurality of blades, the second group of track set DOCCs configured to:
    be placed within the first radial swath of the bit face such that at least two of the track set DOCCs in the second group are located at a second radial position with respect to the rotational axis, the first radial swath of the bit face located outside of a cone zone of a bit profile; and provide a second CDOC greater than the first CDOC.

2. The drill bit of claim 1, further comprising a third group of track set DOCCs disposed on exterior portions of the first set of the plurality of blades, the third group of track set DOCCs configured to:

be placed in a second radial swath of the bit face such that at least two of the track set DOCCs in the third group are located at a third radial position with respect to the rotational axis; and provide the first CDOC.

3. The drill bit of claim 2, wherein the second radial swath is proximate the first radial swath such that the second radial swath partially overlaps the first radial swath on the bit face.

4. The drill bit of claim 2, wherein the second radial swath is proximate the first radial swath such that the second radial swath is located adjacent to the first radial swath on the bit face.

5. The drill bit of claim 2, wherein the second radial swath is located outside of a cone zone of a bit profile.

6. The drill bit of claim 1, wherein the first group of DOCCs are configured to balance the lateral forces of the drill bit.

7. A method of configuring a plurality of depth of cut controllers (DOCCs) of a drill bit comprising:

determining a first critical depth of cut (CDOC) for a first radial swath associated with a bit face of the drill bit;

identifying a first set of a plurality of blades located on the bit face that each include a portion located within the first radial swath; and configuring a first group of track set DOCCs for placement on exterior portions of the first set of the plurality of blades based on the first CDOC, the first group of track set DOCCs configured to:

be placed within the first radial swath such that at least two of the track set DOCCs in the first group are located at a first radial position with respect to a rotational axis of the drill bit; and provide the first CDOC;

determining a second CDOC for the first radial swath associated with the bit face of the drill bit, the second CDOC being greater than the first CDOC;

identifying a second set of the plurality of blades located on the bit face that each include a portion located with the first radial swath; and configuring a second group of track set DOCCs for placement on exterior portions of the second set of the plurality of blades based on the second CDOC, the second group of track set DOCCs configured to:

be placed within the first radial swath such that at least two of the track set DOCCs in the second group are located at a second radial position with respect to the rotational axis of the drill bit, the first radial swath of the bit face located outside of a cone zone of a bit profile; and provide the second CDOC.

8. The method of claim 7, further comprising:

identifying the first set of the plurality of blades located on the bit face that each include a portion located within the second radial swath; and configuring a third group of track set DOCCs disposed on exterior portions of the first set of the plurality of blades, the third group of track set DOCCs configured to:

be placed within a second radial swath of the bit face such that at least two of the track set DOCCs in the third group are located at a third radial position with respect to the rotational axis of the drill bit; and provide the first CDOC.

9. The method of claim 8 wherein the second radial swath is proximate the first radial swath such that the second radial swath partially overlaps the first radial swath on the bit face.

10. The method of claim 8, wherein the second radial swath is proximate the first radial swath such that the second radial swath is located adjacent to the first radial swath on the bit face.

11. The method of claim 8, wherein the second radial swath is located outside of a cone zone of a bit profile.

12. The method of claim 7, wherein the first group of DOCCs are configured to balance the lateral forces of the drill bit.

13. The method of claim 7, further comprising:

calculating a CDOC control curve associated with the first radial swath;

comparing the CDOC control curve with the first CDOC; and determining whether the first group of track set DOCCs adequately controls the depth of cut of the drill bit within the first radial swath based on the CDOC control curve.

14. A method of configuring a drill bit comprising:

determining a first depth of cut for a first radial swath associated with an area of a bit face of the drill bit;

identifying cutting elements located on the bit face that each include at least a portion located within the first radial swath;

configuring a first depth of cut controller (DOCC) of a first group of DOCCs for placement on the bit face within the first radial swath based on the first depth of cut for the first radial swath, the first radial swath having a width based on a width of the first DOCC; and configuring a second DOCC of the first group of DOCCs for placement within the first radial swath based on the first depth of cut for the first radial swath, the second DOCC of the first group track set with the first DOCC of the first group such that the first DOCC and the second DOCC of the first group are located at a first radial position with respect to a rotational axis of the drill bit;

determining a second depth of cut for the first radial swath, the second depth of cut being greater than the first depth of cut;

configuring a first DOCC of a second group of DOCCs for placement on the bit face within the first radial swath based on the second depth of cut for the first radial swath; and configuring a second DOCC of the second group of DOCCs for placement within the first radial swath based on the second depth of cut for the first radial swath, the first radial swath of the bit face is outside of a cone zone of a bit profile, the second DOCC of the second group track set with the first DOCC of the second group such that the first DOCC and the second DOCC of the second group are located at a second radial position with respect to the rotational axis of the drill bit.

15. The method of claim 14, further comprising:

determining a second radial swath associated with the bit face of the drill bit;

configuring a first DOCC of a third group of DOCCs for placement on the bit face within a second radial swath based on the first depth of cut; and configuring a second DOCC of the third group of DOCCs for placement within the second radial swath based on the first depth of cut, the second DOCC of the third group track set with the first DOCC of the third group such that the first DOCC and the second DOCC of the third group are located at a third radial position with respect to the rotational axis of the drill bit.

16. The method of claim 15 wherein the second radial swath is proximate the first radial swath such that the second radial swath partially overlaps the first radial swath on the bit face.

17. The method of claim 15, wherein the second radial swath is proximate the first radial swath such that the second radial swath is located adjacent to the first radial swath on the bit face.

18. The method of claim 15, wherein the second radial swath is located outside of a cone zone of a bit profile.

19. The method of claim 14, wherein the first group of DOCCs are configured to balance the lateral forces of the drill bit.

20. The method of claim 14, further comprising:

calculating a CDOC control curve associated with the first radial swath;

comparing the CDOC control curve with the first depth of cut; and determining whether the first group of DOCCs adequately controls the depth of cut of the drill bit within the first radial swath based on the CDOC control curve.

* * * * *